United States Patent [19]
Ingram

[11] Patent Number: 6,074,583
[45] Date of Patent: *Jun. 13, 2000

[54] METHOD AND APPARATUS FOR COMPRESSION MOLDING PLASTIC ARTICLES

[75] Inventor: Keith W. Ingram, Holland, Ohio

[73] Assignee: Owens-Illinois Closure Inc., Toledo, Ohio

[ * ] Notice: This patent is subject to a terminal disclaimer.

[21] Appl. No.: 08/935,217

[22] Filed: Sep. 22, 1997

Related U.S. Application Data

[63] Continuation-in-part of application No. 08/473,479, Jun. 7, 1995, Pat. No. 5,670,100, which is a continuation-in-part of application No. 08/135,829, Oct. 14, 1993, Pat. No. 5,554,327.

[51] Int. Cl.[7] ............... B29C 43/08; B29C 43/18; B29C 43/58
[52] U.S. Cl. ............ 264/40.5; 264/268; 264/297.6; 264/310; 425/149; 425/150; 425/348; 425/453; 425/457; 425/809
[58] Field of Search ............... 264/40.5, 40.6, 264/268, 269, 297.3, 297.6, 297.5, 310, 319, 320; 425/127, 150, 149, 348 R, 453, 457, 411, 412, 418, 419, 189, 809

[56] References Cited

U.S. PATENT DOCUMENTS

| | | | |
|---|---|---|---|
| 4,776,782 | 10/1988 | Murayama et al. | 425/809 |
| 5,554,327 | 9/1996 | Ingram et al. | 264/40.5 |
| 5,670,100 | 9/1997 | Ingram | 264/40.5 |

Primary Examiner—Mathieu D. Vargot

[57] ABSTRACT

A method and apparatus for compression molding plastic articles including closures which includes providing co-acting sets of tools including a first set for moving a core and core sleeve into engagement with a cavity mold on a second set of tooling. An actuator is provided between the first set of tooling and a fixed upper cam. The second set of tooling includes an associated actuator supporting the cavity mold and associated with a lower fixed cam. A nitrogen cylinder in the second set of tooling provides for control of the compression molding force. In a preferred form, a plurality of sets of tooling are provided in circumferentially spaced relation on a rotating turret supported by a central column. A common manifold supplies the pressure at accurately controlled pressure to each of the nitrogen cylinders. A control system is provided for monitoring and changing the pressure.

44 Claims, 26 Drawing Sheets

METHOD AND APPARATUS FOR COMPRESSION MOLDING PLASTIC ARTICLES

This application is a continuation-in-part of U.S. application Ser. No. 08/473,479 filed Jun. 7, 1995, having a common assignee with the present application, now U.S. Pat. No. 5,670,100, which is a continuation-in-part of application Ser. No. 135,829 filed Oct. 14, 1993, now U.S. Pat. No. 5,554,327.

This invention relates to a method and apparatus for compression molding plastic articles including closures.

BACKGROUND AND SUMMARY OF THE INVENTION

It is common to compression mold plastic articles including closures, as contrasted to injection molding plastic articles. Typical patents comprise U.S. Pat. Nos. 2,072,536, 2,155,316, 2,218,456, 2,402,462, 2,891,281, 3,210,805, 4,296,061, 4,314,799, 4,343,754, 4,355,759, 4,497,765, 4,640,673, 4,755,125 and EPA 0 091 653 A2.

In the compression molding of plastic articles, there are inherent variations that can affect the resultant articles. One such variance is the manufacturing tolerance applied to the tools. Accordingly, the molding sets on a machine are not identical. Thus, when the tools are made up in the molding position, the volume of the space between the molding surfaces varies between mold sets. A further variance is the weight and/or volume of the plastic charge that is placed within each mold set.

In the above-identified patent application, there is disclosed an invention which provides a method and apparatus for compression molding plastic articles including closures wherein the forming pressure can be accurately controlled; wherein the forming pressure can be readily adjusted; wherein lateral forces on the tooling are not applied directly to the forming tool; wherein the tooling may be readily replaced; wherein the number and size of tool stations can be readily changed; and wherein various kinds and sizes of articles including closures can be readily made by changing the tooling and associated actuating mechanisms; wherein the tooling will compensate for variations in pellet or charge weight, variations in mold tooling volume in the closed mold position and wherein a substantial overload such as a double charge of plastic can be readily absorbed without overloading the tooling or the overall apparatus.

In the above-identified patent application, the method and apparatus for compression molding plastic articles including closures includes providing co-acting sets of tools including a first set for moving a core and core sleeve into engagement with a cavity mold relative to a second set of tooling. The first set of tooling includes an actuator between the tooling and a fixed upper cam. The second set of tooling includes an actuator supporting the cavity mold and associated with a lower fixed cam. A gas cylinder charged with atmospheric gas at a predetermined pressure, preferably nitrogen, is provided in the second set of tooling and controls the compression molding force. In a preferred form, a plurality of sets of tooling are provided in circumferentially spaced relation on a rotating turret supported by a central column. A common manifold supplies the pressure at accurately controlled pressure to each of the nitrogen cylinders.

Each individual gas charged cylinder in association with its individual tooling has a common predetermined pressure as defined by the system pressure, each cylinder being connected in parallel with each of all the tooling cylinders by means of connecting pipework and manifolds.

In the preferred form, each of the gas cylinders has a common diameter and consequently will require an equal force to deflect each of the pistons within its respective cylinder against the common system pressure. In the compression molding process, it is preferred that each molded part be molded with a constant molding force and that variations are held to a minimum. This force will be sufficient to fully form the part but no so high as to cause flashing of the material from the adjoining mold surfaces.

It is well known in the art that volumetric variations occur within the tooling due to manufacturing tolerances and that the plastic material charge can vary in weight and volume. Further, it is understood that occasional gross errors will occur in the pellet charge volume as a result of incorrect machine setting, or as a result of double charge of plastic, or as a result of a prior molded part not being released from the mold prior to receiving a further charge of material.

For this reason, it is preferred to include a means to compensate for the accumulated volumetric variance resulting from the above phenomena while not exceeding the preset molding force established by the system pressure previously mentioned.

Further, there is a limit of volumetric variance beyond which the resulting part is nonfunctional as defined by the desired geometry of the part being molded.

In a preferred form, each of the first set of tools is advanced a common fixed stroke toward the respective cavity within the second set of tools to close the mold and to form the plastic to fill the mold. Normally the plastic charge is within the desired weight tolerance to correctly form the part and the pressure in the melt builds up during the forming stage until the desired molding force is reached and the cavity is deflected against the supporting gas cylinder to limit any further increase in molding force. By this means, when the desired molding force is reached, the volumetric space within the tooling combination will remain substantially constant for the duration of the stroke of the first set of tooling.

If the plastic charge was of a size less than the lower tolerance to produce a functional part and of insufficient size to fill the mold, then the desired molding force would not be achieved prior to the completion of the stroke of the first tooling and the resulting part could have voids, often referred to as "shorts".

Clearly, if a charge of material exceeded the maximum tolerance to produce a quality part, then it is important to ensure that the tooling volume is compensated by further deflection of the cavity under the control of its respective gas cylinder in order that the mold force does not reach such proportion as to damage the tooling or the machine.

To maintain a constant molding force within each of successive tools, it is preferred that the force compensating means is contained within the tool and thus independent of any external influences and has a minimum of moving parts to reduce friction. It is also preferred not to use mechanical springs for force compensation as they have a variance in spring rating, are subject to failure, and cannot readily be re-set.

In the compression molding of closures having a peripheral wall and a base portion, it is desirable to accommodate variable charges of plastic material and at the same time not affect the axial relationship of the male and female components of the mold. In accordance with a further aspect of the invention, a method and apparatus are provided by using a two piece cavity mold having relative movement between the two pieces wherein the relative movement is controlled by a gas cylinder in opposition to the molding force. Such a method and apparatus are useful in making threaded closures, double wall closures and tamper indicating closures.

In the making of closures wherein the amount of plastic in the peripheral wall of the closure is controlled, in accordance with the invention, the method and apparatus comprises providing lower tooling wherein the cavity comprises two pieces, an inner portion forming the base of the closure and an outer portion which forms the peripheral wall of the closure. The outer portion is spring loaded and the inner portion is supported by gaseous pressure of a gas cylinder. The outer portion may be actuated by an external actuator actuated by an additional cam.

In accordance with another form of the invention, in the making of a closure having dual or double peripheral walls, the cavity of the mold is provided with an inner portion and an outer portion wherein the inner portion is supported by the gaseous pressure of a gas cylinder. The tooling includes a core, a spring loaded core sleeve, a stripper sleeve and an inner sleeve. The inner sleeve is actuated by an auxiliary actuator and cooperates with the cavity and the core and outer sleeve to provide the double wall by manipulation.

In accordance with the another form of the invention, the tooling is configured to form a child resistant closure and an auxiliary actuator is operated to permit the formation of the tamper indicating band and then form the bridges that connect the tamper indicating band to the closure.

DESCRIPTION

Figure 1:
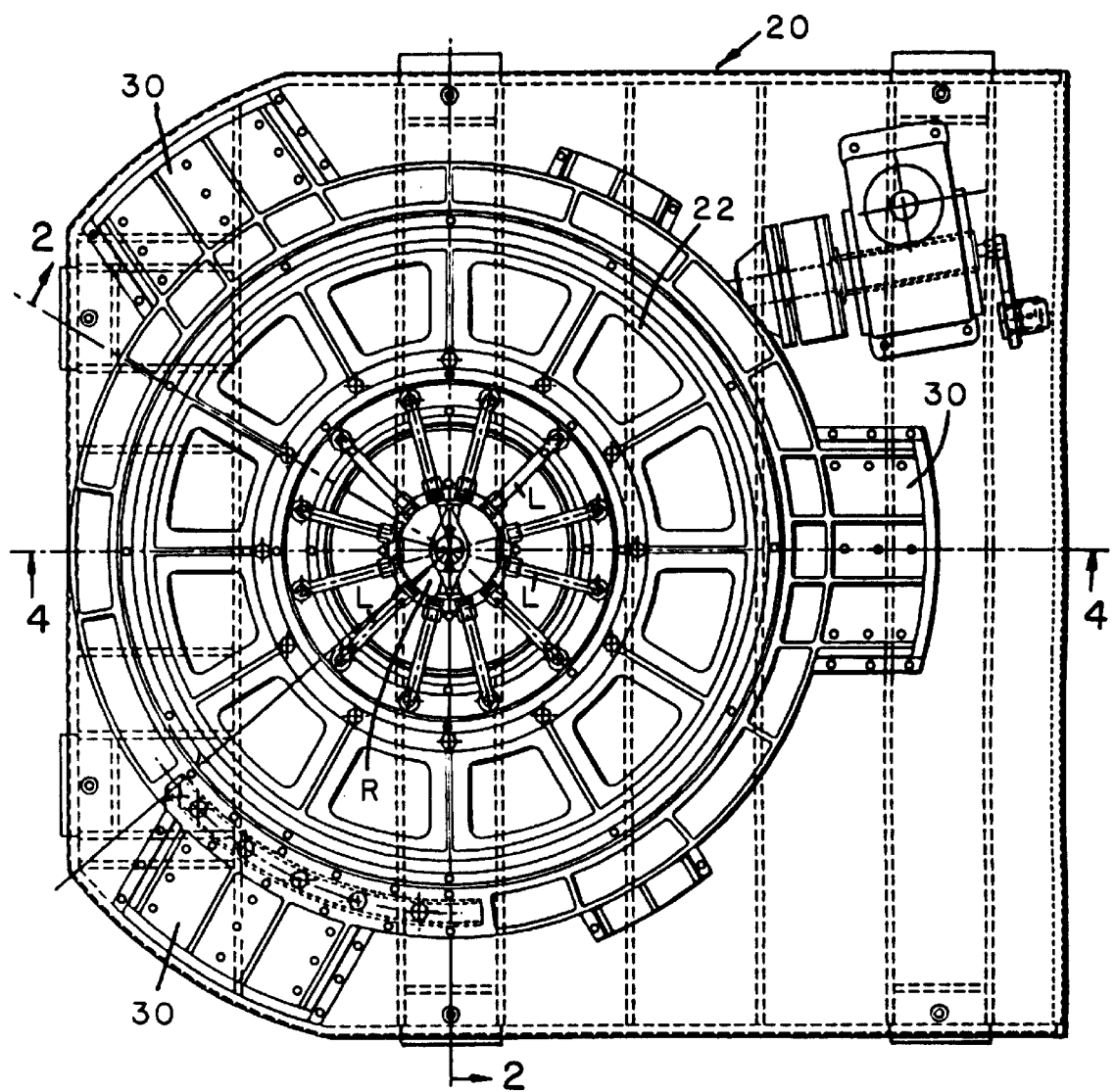
FIG. 1 is a plan view of an apparatus embodying the invention.
Figure 2:
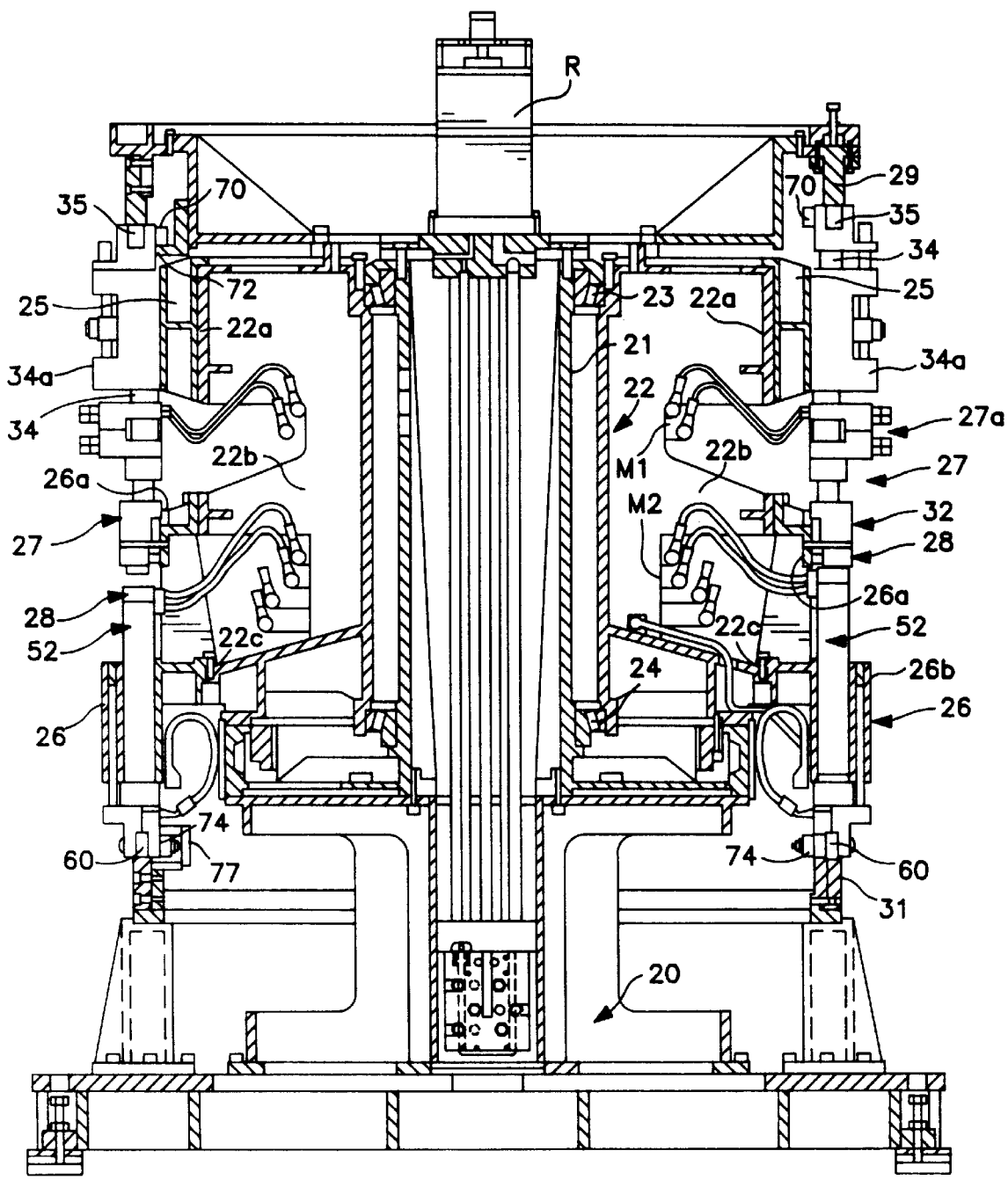
FIG. 2 is a sectional view taken along the line 2—2 in FIG. 1.
Figure 3:
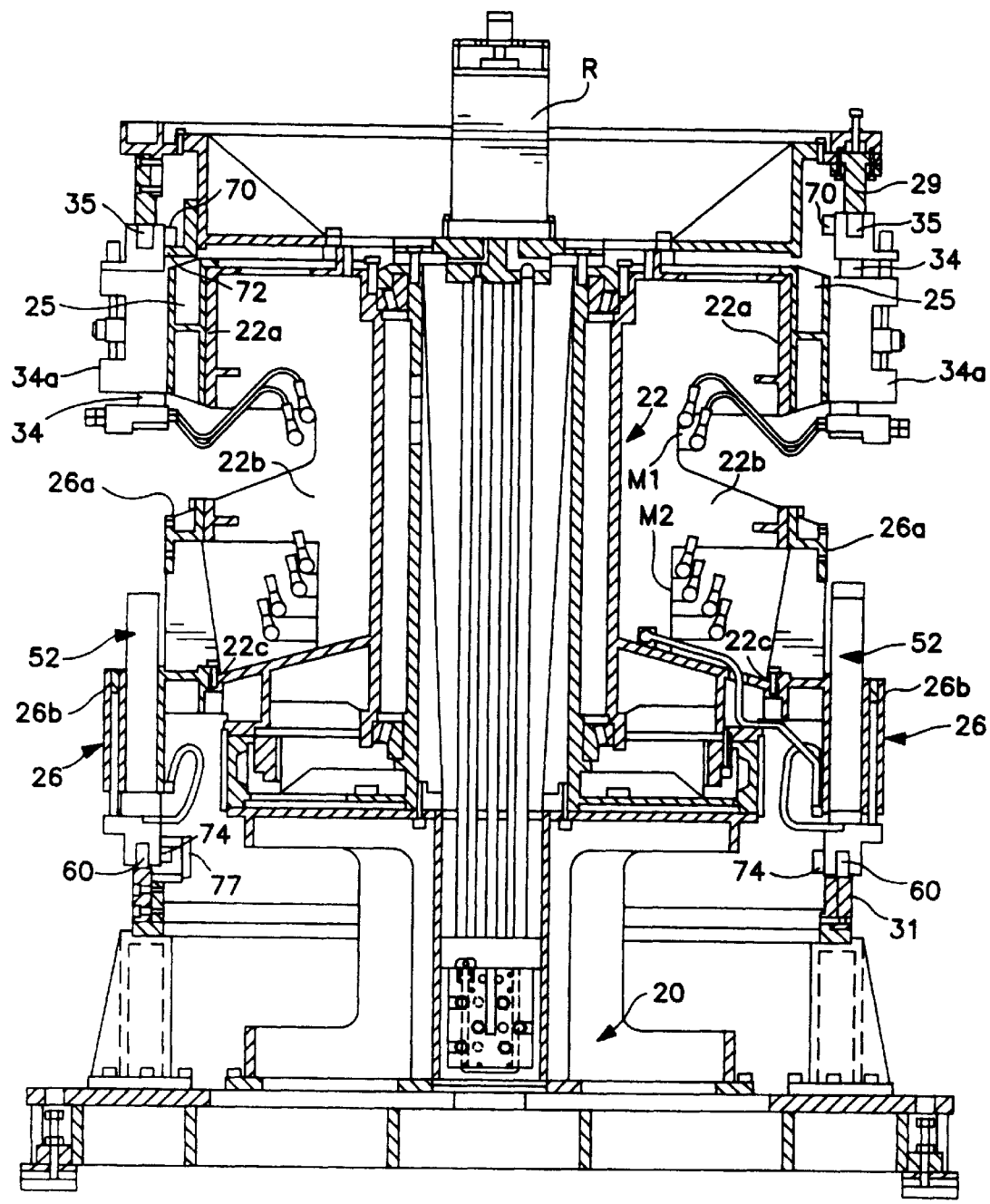
FIG. 3 is a sectional view similar to FIG. 2 with parts being removed.

Referring to FIGS. 1–3, the method and apparatus embodying the invention is shown as applied to a rotary apparatus that includes a base 20, supporting a column 21 on which a turret or carousel 22 is rotatably mounted by upper and lower tapered bearings 23, 24. Turret 22 includes vertically spaced supports comprising an annular upper support 22a, an annular support 22b, and a lower annular support 22c. A plurality of upper support segments 25 are mounted on upper support 22a and abut to define a ring. A plurality of lower segments 26 are mounted on the intermediate and lower supports 22b, 22c and abut to define a ring. Each segment 25 supports one or more of circumferentially spaced sets of actuators 34. Each segment 26 supports one or more actuators 52 adjacent the lower end of the apparatus. The actuators 34 are mounted for vertical movement in housings 34a mounted upon support segments 25 which, in turn, are supported on an upper ring mount 22a (FIGS. 2, 3).

Figure 4:
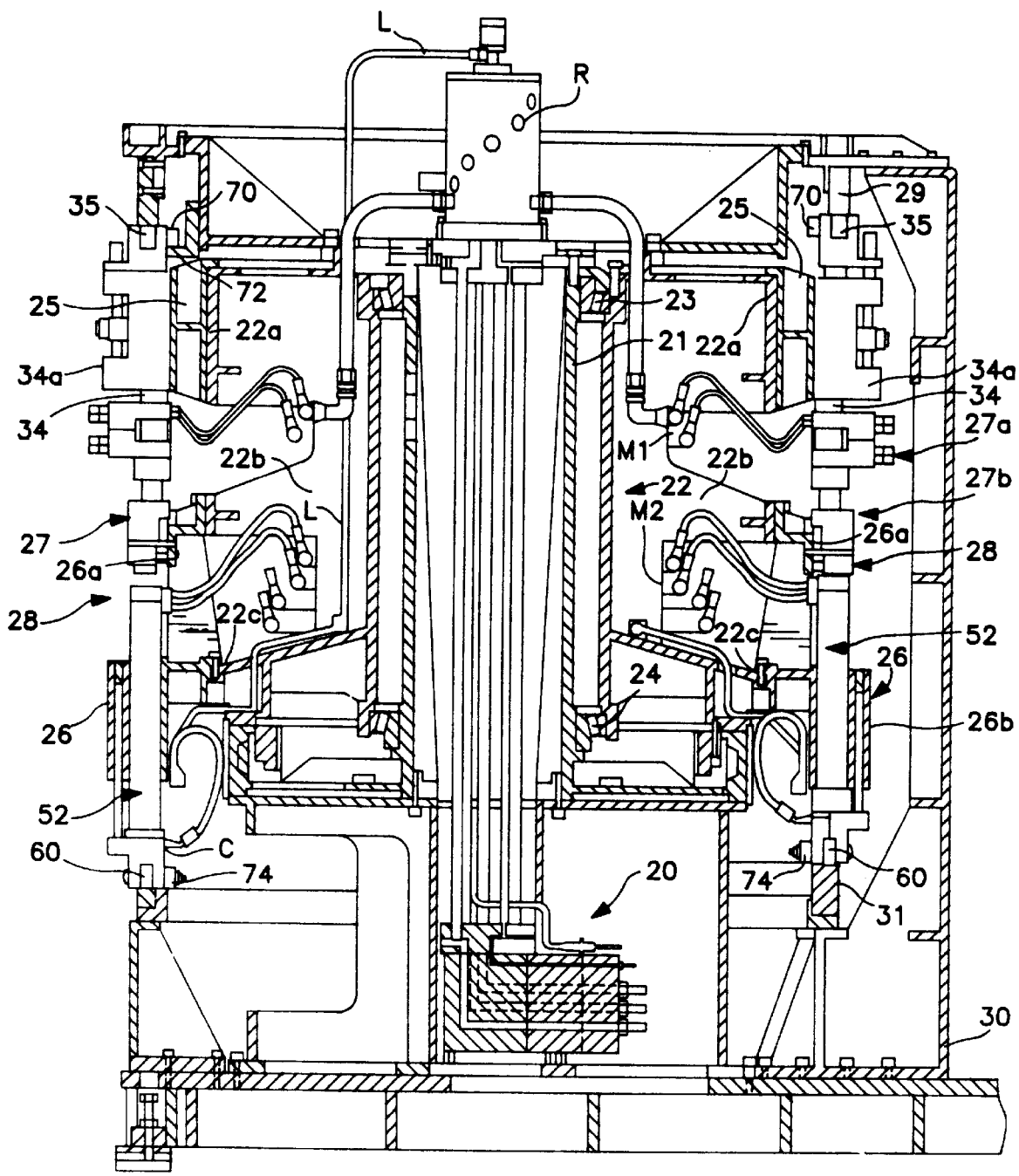
FIG. 4 is a fragmentary sectional view taken along the line 4—4 in FIG. 1.
Figure 6:
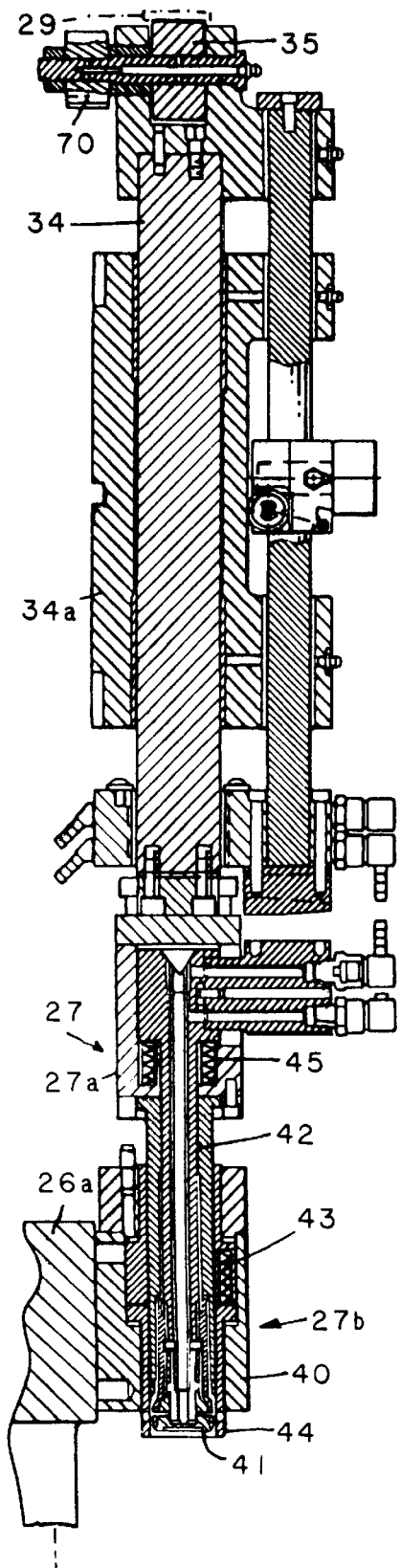
FIG. 6 is a vertical sectional view of one set of upper and lower tooling.
Figure 6:
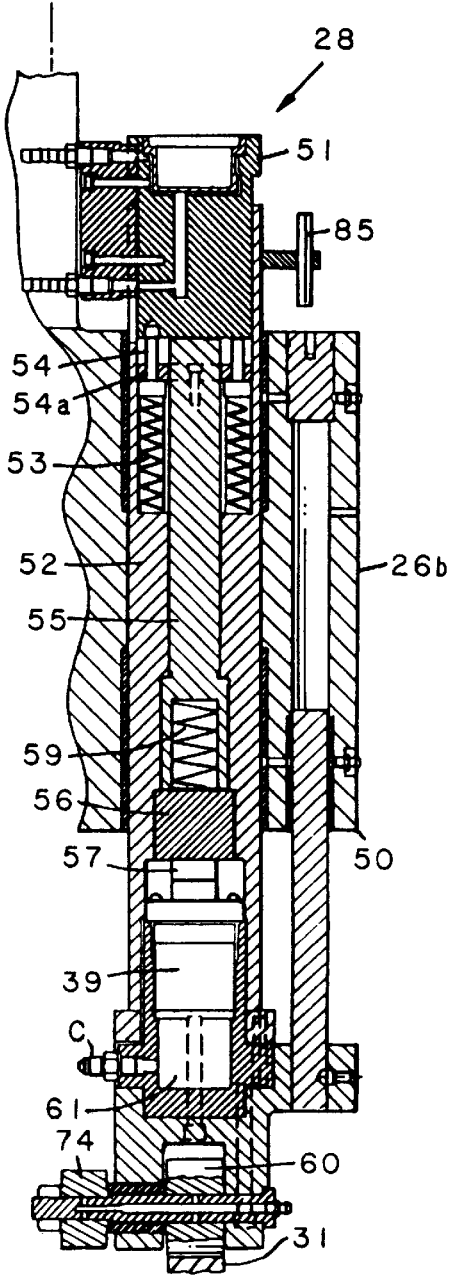

An upper set of tooling 27 is associated with each actuator 34 and includes a movable assembly 27a mounted on the lower end of actuator 34 and a fixed assembly 27b mounted on a portion 26a of segment 26 that is fixed to support 22b (FIG. 6). A fixed annular cam 29 is supported by columns 30 (FIGS. 1, 4) and is associated with the upper actuators 34. Actuator 34, in turn, has a cam roller 35 at its upper end for engaging the cam 29.

A set of lower tooling 28 is mounted on each lower actuator 52. A fixed annular cam 31 is supported on base 20 and is associated with the lower actuators 52.

Each lower assembly 28 of tooling includes a female mold assembly 51 and a cooling water manifold 51a. Each actuator 52 has a roller 60 on its lower end for engaging cam 31 (FIG. 6).

Referring to FIG. 6, the fixed assembly 27b is mounted on a segment portion 26a of the segment 26. The movable assembly 27a comprises a mold plunger or core 41, a spring loaded core sleeve 42 urged upwardly by springs 45 and a stripper sleeve 44 urged downwardly by stripper springs 43. The core 41 is made in several sections and defines a male mold.

Figure 7:
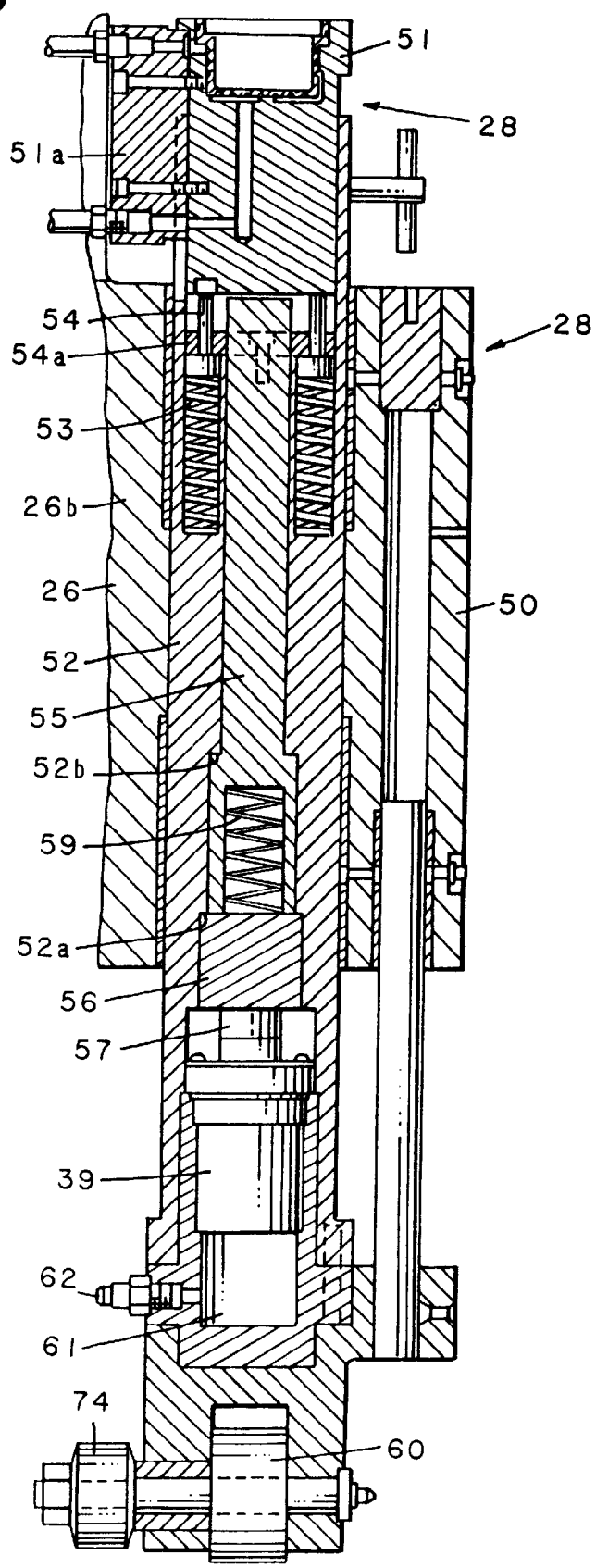
FIG. 7 is a fragmentary sectional view on an enlarged scale of the lower assembly of the set of tooling shown in FIG. 6.

Referring to FIGS. 6 and 7, each actuator 52 is mounted in a support body 50 forming a part of segment portion 26b. The mold 51 has limited relative movement with respect to the actuator 52 and is yieldingly urged upwardly by cavity springs 53 which act upon lift pins 54. The lower actuator 52 further includes a plunger 55 that engages a holding spring plug 56 which in turn engages the piston 57 of a nitrogen cylinder 39. A centering spring 59 is interposed between the holding spring plug 56 and the plunger 55. The nitrogen cylinder 39 is provided with nitrogen at an accurately determined pressure supplied to the area or chamber 61 below the nitrogen chamber 39 through a connector 62 having an orifice.

In this tooling style, the molding force is applied through the core sleeve 42 and the core 41 attached to the core sleeve 42 by a lost motion connection, the core 41 being biased upward by the array of springs 45. The upper cam 29 is fixed and the core sleeve 42 thus moves downward a fixed stroke as controlled by the upper cam 29.

Figure 12:
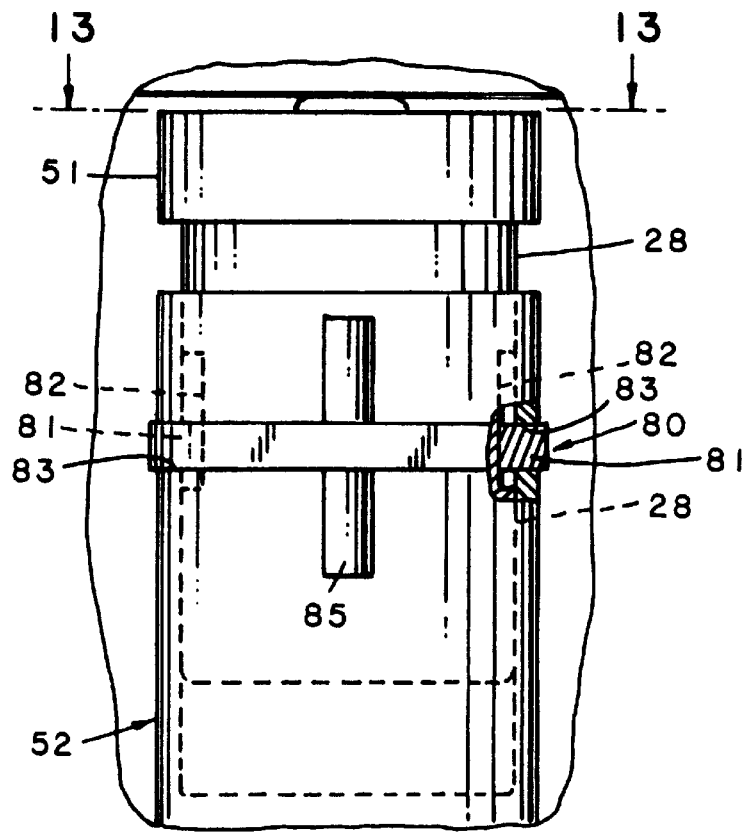
FIG. 12 is a fragmentary side elevational view of a portion of the tooling shown in FIG. 7.
Figure 13:
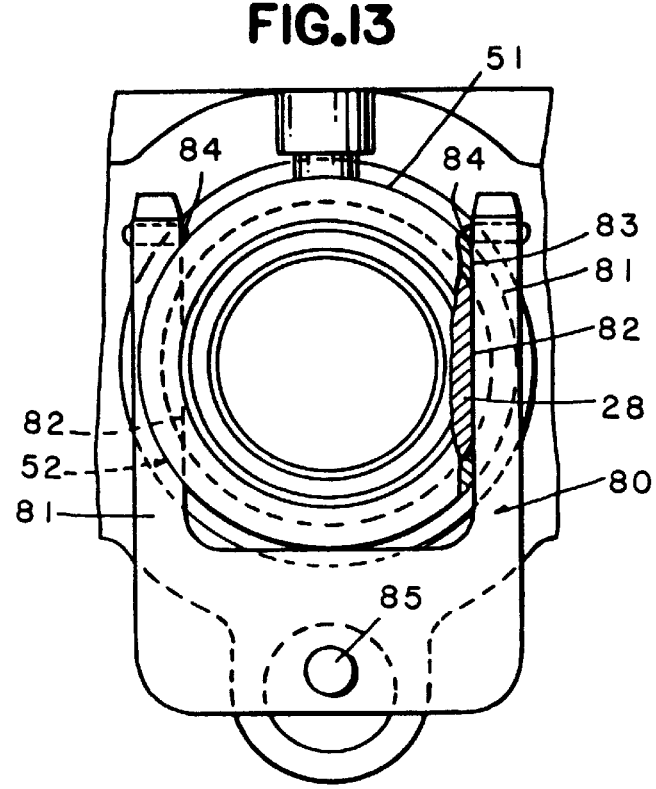
FIG. 13 is a fragmentary sectional view taken along the line 13—13 in FIG. 12.

Referring to FIGS. 12 and 13, provision is made for rapid removal of the cavity mold 51 and comprises a yoke 80 having spaced arms 81 that engage annular groove 83 in the actuator 52 and groove 82 in the cavity mold 51. Grooves 83 in actuator 52 are snugly engaged by arms 81. Groove 82 in cavity mold 51 has a greater axial width such that the cavity mold 51 has limited axial movement relative to the actuator 52. Spring loaded plungers 84 on the arms 81 extend inwardly to engage the periphery of mold 28. Yoke 80 includes a handle 85 to facilitate grasping the yoke 80.

The one piece cavity mold 51 is located on the lower tooling actuator 52, but is free to move axially a limited amount relative to actuator 52 by the construction shown in FIGS. 12 and 13 and the cavity mold 51 is held up by the array of springs 53 within the lower tooling actuator 52. These springs 53 are limited in stroke by the lift pins 54, which bottom out on a lift pin retainer 54a. The cavity mold 51 rests on the plunger 55, which is retained to limit its upward travel. The plunger 55 contacts the holding spring plug 56 and a spring 59 is fitted between the two components. The holding spring plug 56, in turn, contacts the piston rod 57 of nitrogen cylinder 39.

Referring to FIG. 7, nitrogen cylinder 39 is normally fully outstroked, maintaining the holding spring plug 56 against the locating stop surface 52a in the lower tooling actuator 52. The plunger 55, when free, will be moved up by the center spring 59 until it reaches a stop surface 52b within the lower tooling actuator 52.

Referring to FIG. 6, provision is made for lowering the upper actuator 34 and comprises the first roller 35 on the upper end thereof for engaging the upper cam 29 to cause the downward movement of the male mold assembly 32. In addition, a second roller 70 is provided for rotation about the same axis as roller 35 that engages a second fixed upper cam 72 (FIG. 2) for lifting the upper tooling 27 during the operating cycle in order.

Referring to FIG. 6, provision is made for lifting the lower actuator 52 and comprises a roller 60 on actuator 52 that engages the lower cam 31. In addition, a second roller 74 is provided for rotation about the same axis as roller 60 and engages a second fixed lower cam 77 for insuring that the cavity mold 51 is in its lowest position to receive a pellet of plastic.

Operation

Referring to FIGS. 6–11, the operation includes a series of steps:

Position #1 Open

FIGS. 6–7 show the tooling open condition with the upper tool assembly 27 up and the lower tool assembly 28 down.

Position #2 Closing of Mold

Figure 8:
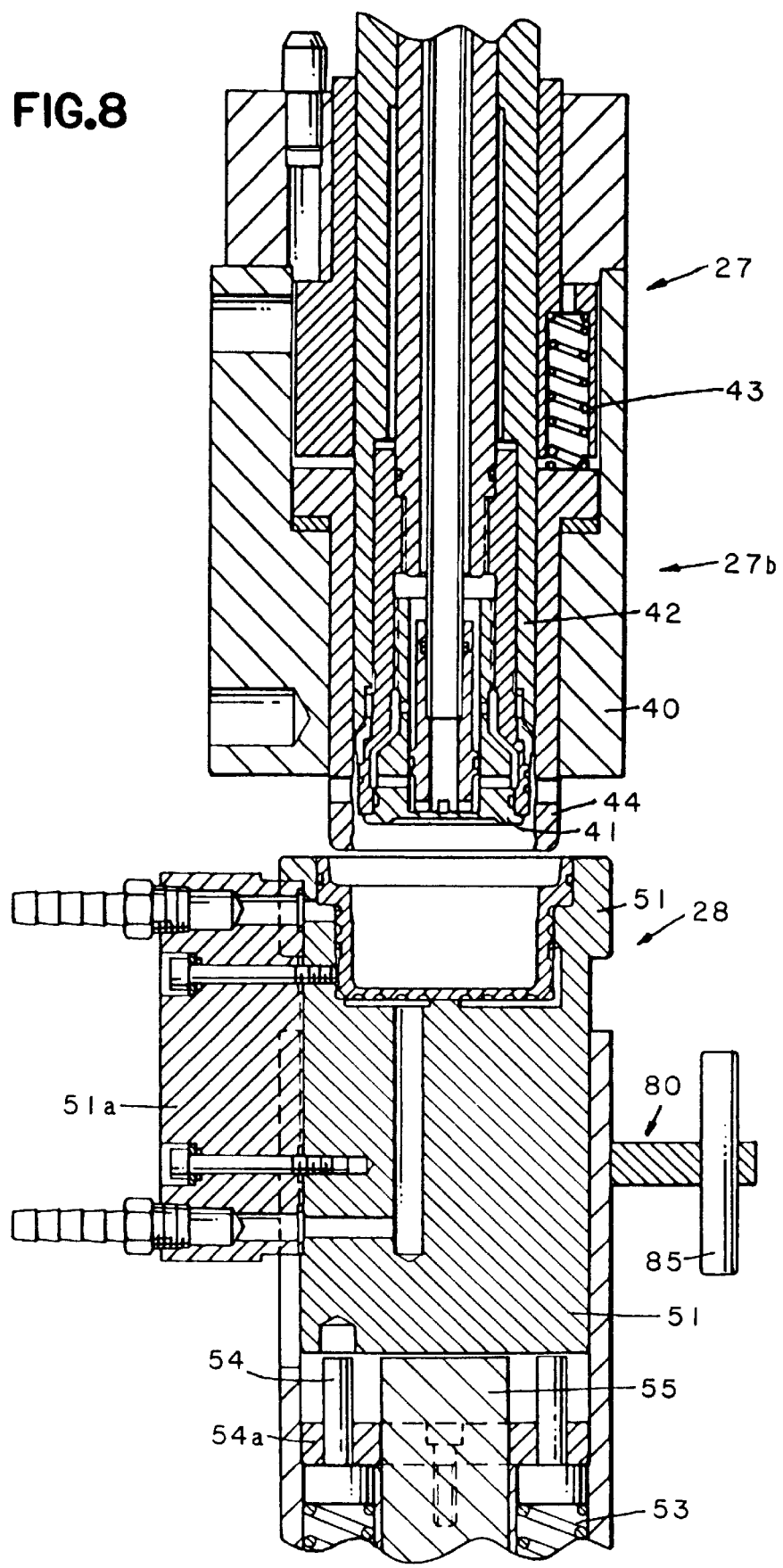
FIGS. 8–11 are fragmentary sectional views of one set of tooling during various stages of compression molding.
Figure 9:
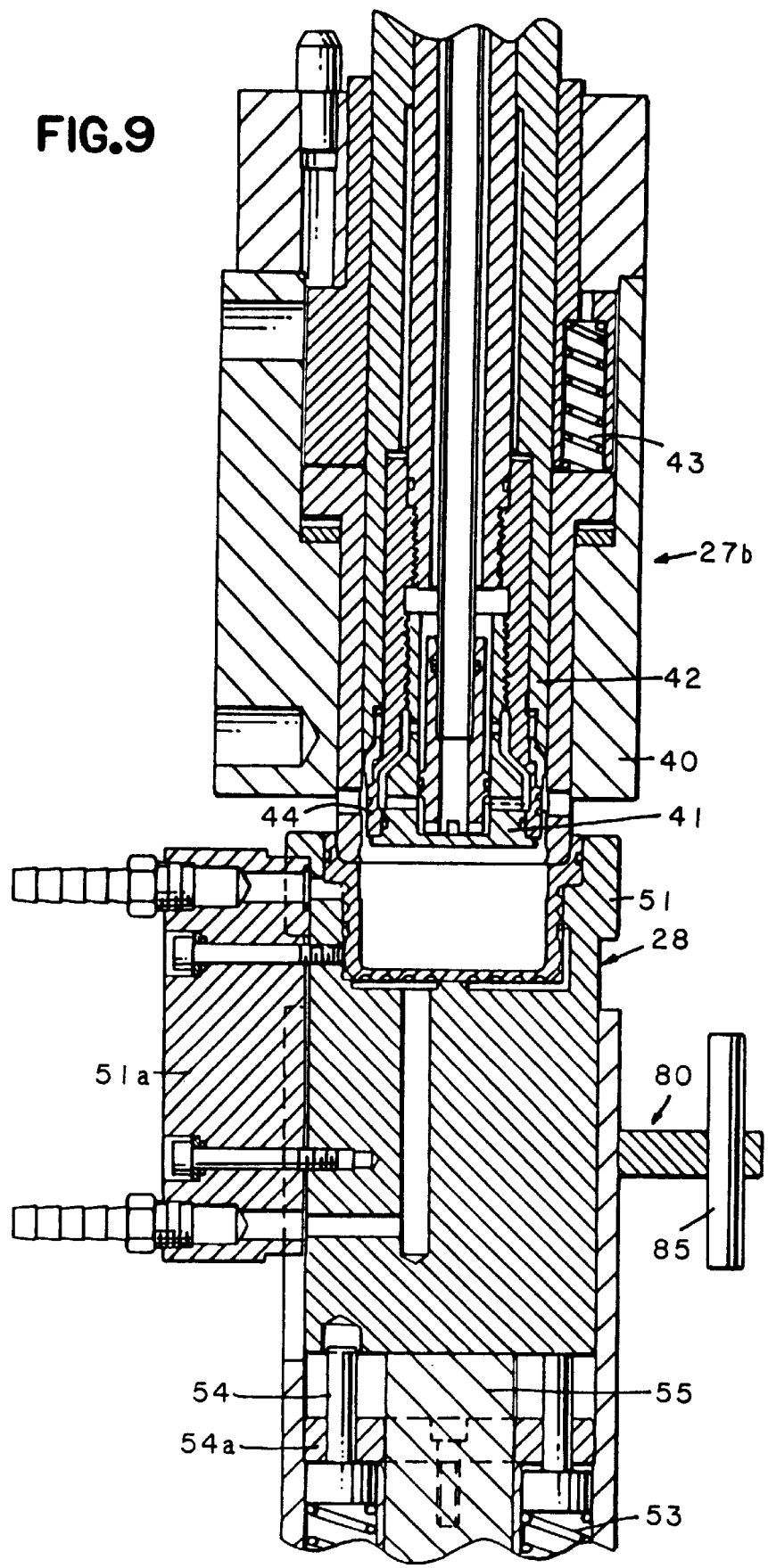

As shown in FIG. 8, after a charge or pellet of thermoplastic material is delivered to the female mold, the lower tooling actuator 52 is raised a fixed stroke by the lower cam 31, and the cavity 51 contacts the stripper sleeve 44 (FIG. 9). The stripper sleeve springs 43 initially overpower the weaker cavity springs 53, and subsequently the small spring 59 (FIG. 6) in the plunger 55 until the clearances are taken up and the nitrogen cylinder 39 opposes any further compression of the cavity. At this point the stripper sleeve 44 is forced upward against springs 43 for the remainder of the lower tooling upward stroke.

Position #3 Molding

Figure 10:
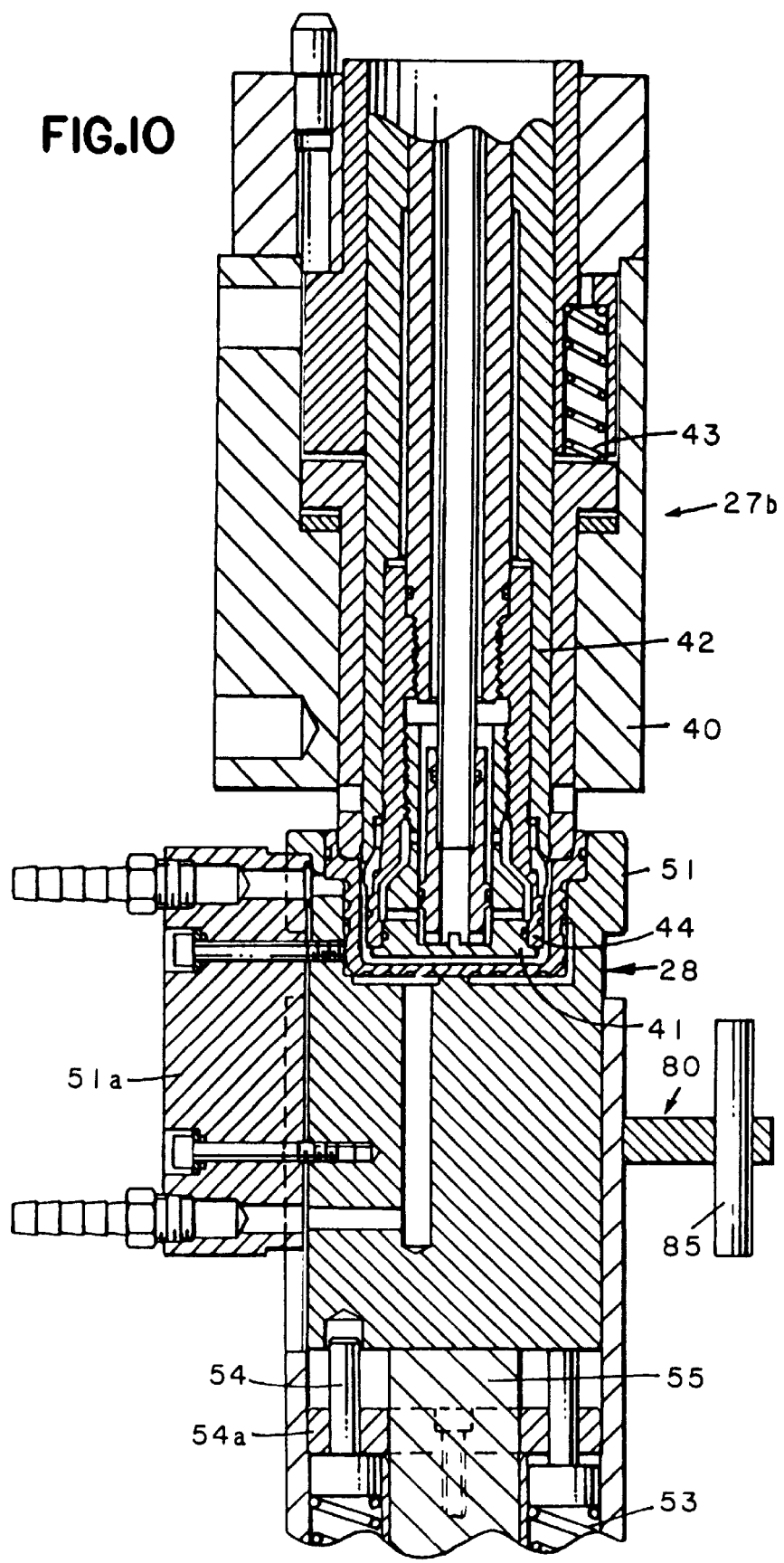

Referring to FIG. 10, the upper tooling is now lowered a fixed stroke to form the part, as controlled by the fixed upper forming cam 29. When the forming pressure increases to generate a force equal to the force of the nitrogen cylinder 39, then the piston 57 of the nitrogen cylinder 39 moves to limit the molding force on the tooling. This forces the cavity 51 to lower, and causes the stripper sleeve springs 43 to move the stripper sleeve 44 downward in unison with the cavity 51, until the upper tool stroke is completed.

Position #3 Holding

Figure 11:
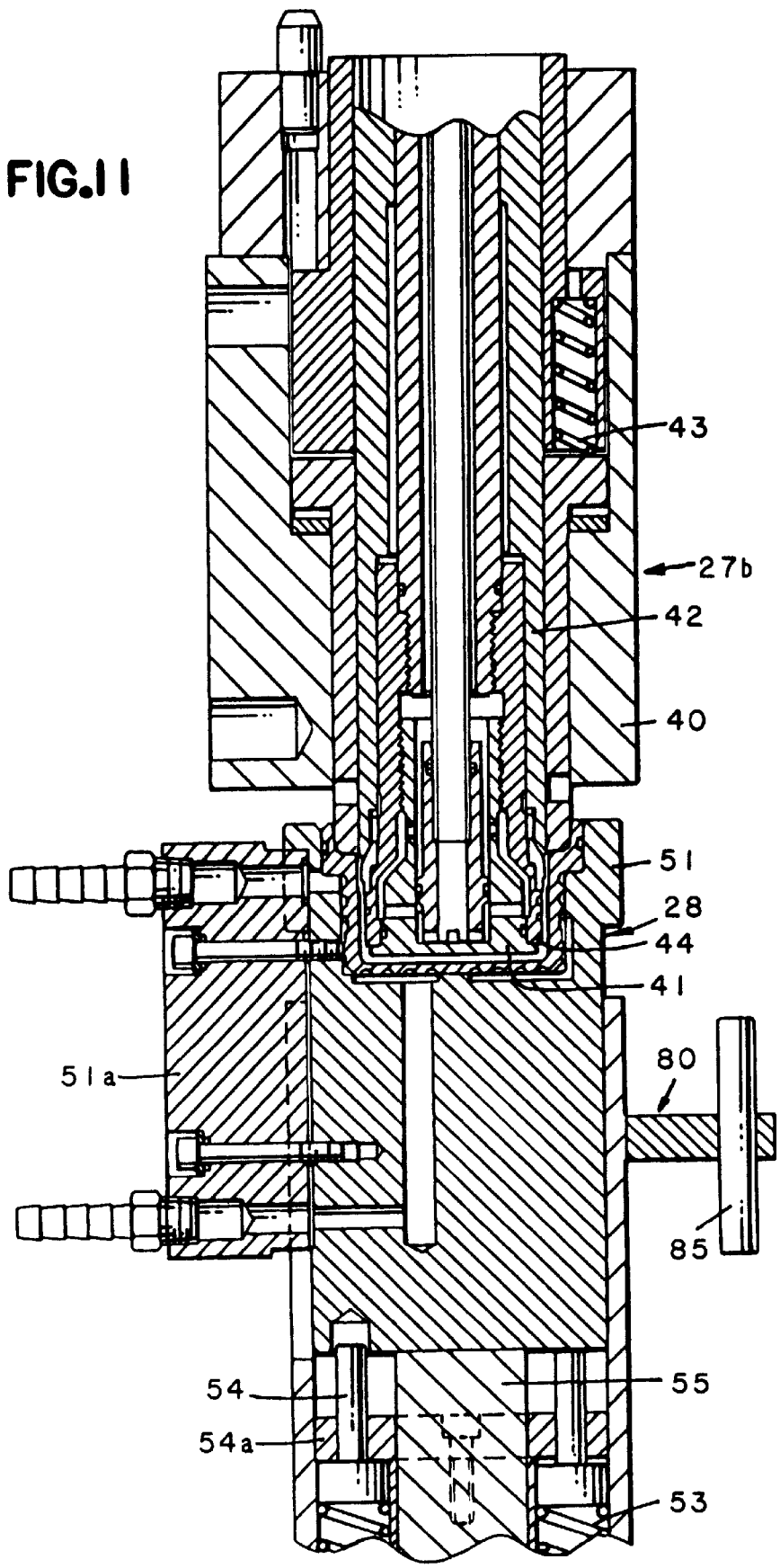

Referring to FIG. 11, a holding pressure is achieved through the parallel sections of the cams 29, 31, under control of the nitrogen cylinder 39. No relative axial movement of the tooling takes place during this phase.

Position #4 Lowered Holding Force Section

Referring to FIG. 11, a lesser holding force is achieved by a relief step in the upper cam 29, which allows the core sleeve 41 to become free from the cam 29. This causes the piston 57 of nitrogen cylinder 39 to outstroke until the holding spring plug 56 bottoms out. The cavity 51 is simultaneously lifted by the nitrogen cylinder 39, and the core sleeve 42 along with the core 41 are lifted by the cavity 51. The holding force is now maintained by the weight of the upper actuator 34 and the tooling pin assembly. The cavity springs 53 in the lower actuator 52 play no role in this part of the cycle and remain compressed by the higher rated stripper sleeve springs 43. The small spring 59 on the inner shaft 55 is also ineffective at this time.

Position #5 Cavity Stripping

During stripping of the closure from cavity 51, the lower tooling actuator 52 is lowered, leaving the closure on the molding core 41. If a threaded closure has been molded, then normally the stripper sleeve springs 43 would not overcome the closure strip force required, and would remain compressed, and the stripper sleeve 44 would not move down.

The core sleeve 42 is subsequently withdrawn by direct upward cam action due to engagement of roller 70 with second upper cam 71 (FIG. 2). The resistance of the closure to stripping from the threads causes the core 41 to stay down, until its lost motion with the core sleeve 42 is taken up. At this time, the core 41 is also pulled up by the action of the core sleeve 42, causing the core sleeve 42 to compress the array of core sleeve springs 45, and the part to be stripped from the core 41 as the stripper sleeve springs 43 overcome the stripping force.

Figure 14:
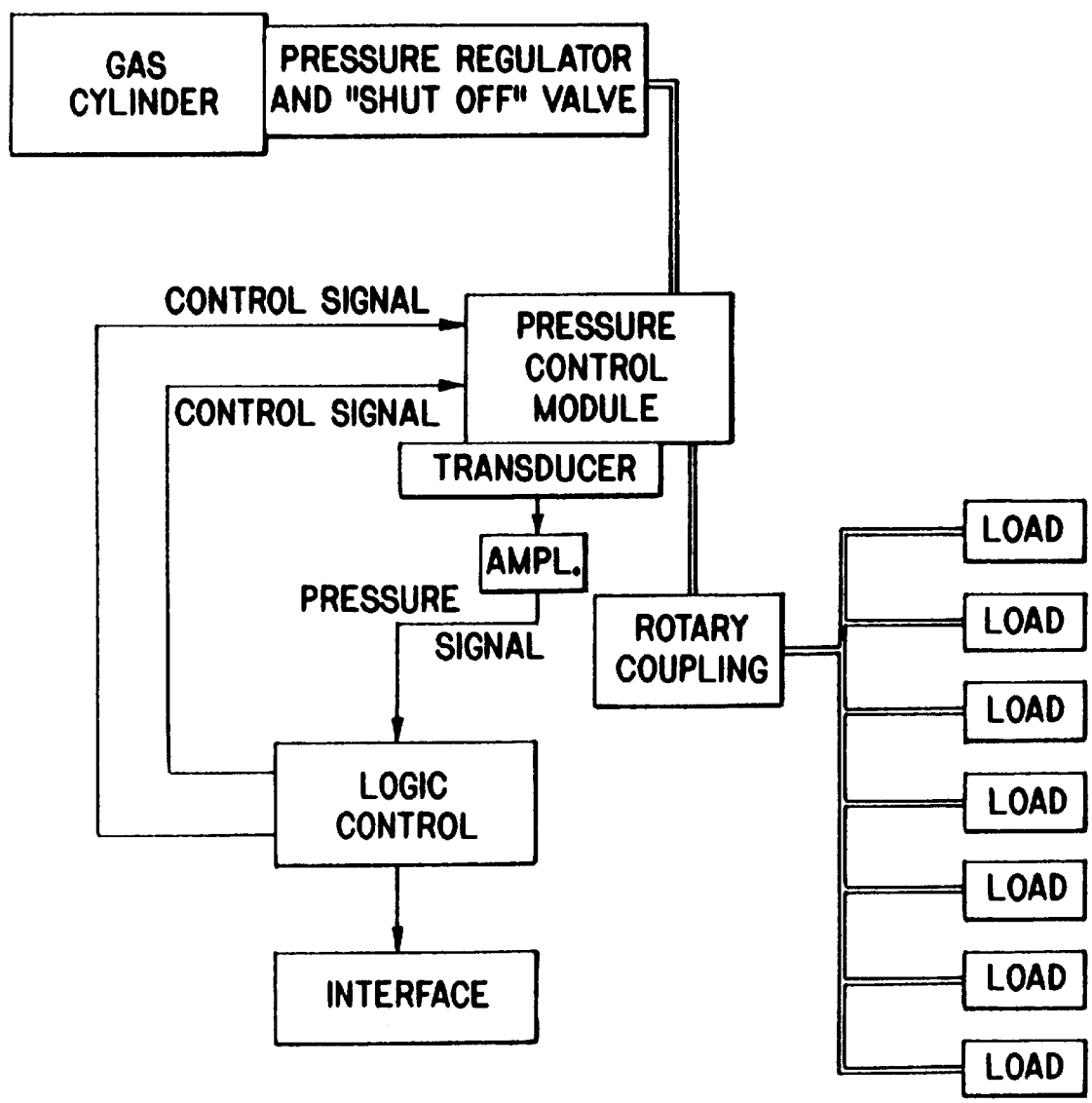
FIG. 14 is a schematic diagram of the nitrogen system utilized in the invention.

Referring to FIG. 14, the control system for supplying nitrogen to each of the cylinders can be more readily understood by reference to this schematic. The designation LOAD represents cylinders which are connected to a rotary coupling R (FIG. 2) on the turret 22 that, in turn, is connected through a pressure control module and a pressure regulator and shut-off valve to a source of nitrogen such as a gas cylinder. Lines L such as hoses extend from the rotary coupling R (FIG. 1) to couplings C of the nitrogen cylinders 39 (FIG. 6). In the preferred form, the pressure control module includes a solenoid operated valve to exhaust gas to atmosphere, and a second solenoid valve to admit pressurized gas from the nitrogen gas cylinder. The interface is a computer and interactive screen to allow an operator to select a desired system pressure setting by direct input, or the setting could be established automatically by a menu selection from the computer. Preferably, the pressure signal reference to the logic control represents a high and a low pressure limit, and the logic control continually compares the feedback signal from a pressure transducer representing the actual system pressure at any one time. When a pressure is detected above the high limit setting, the logic control energizes the first solenoid valve to exhaust gas from the system until the system pressure is within limits. Conversely, a system pressure lower than the low limit causes the second solenoid valve to operate and to admit high pressure nitrogen from the gas cylinder until the system pressure is again within the preset limits. In simplest form, the valves could be energized on a time bse to avoid the complexity of dual limits.

Although the above description represents a preferred form of the pressure control module, other control systems may be used in which this control is achieved, and it it not intended to limit the scope of the invention.

Figure 5:
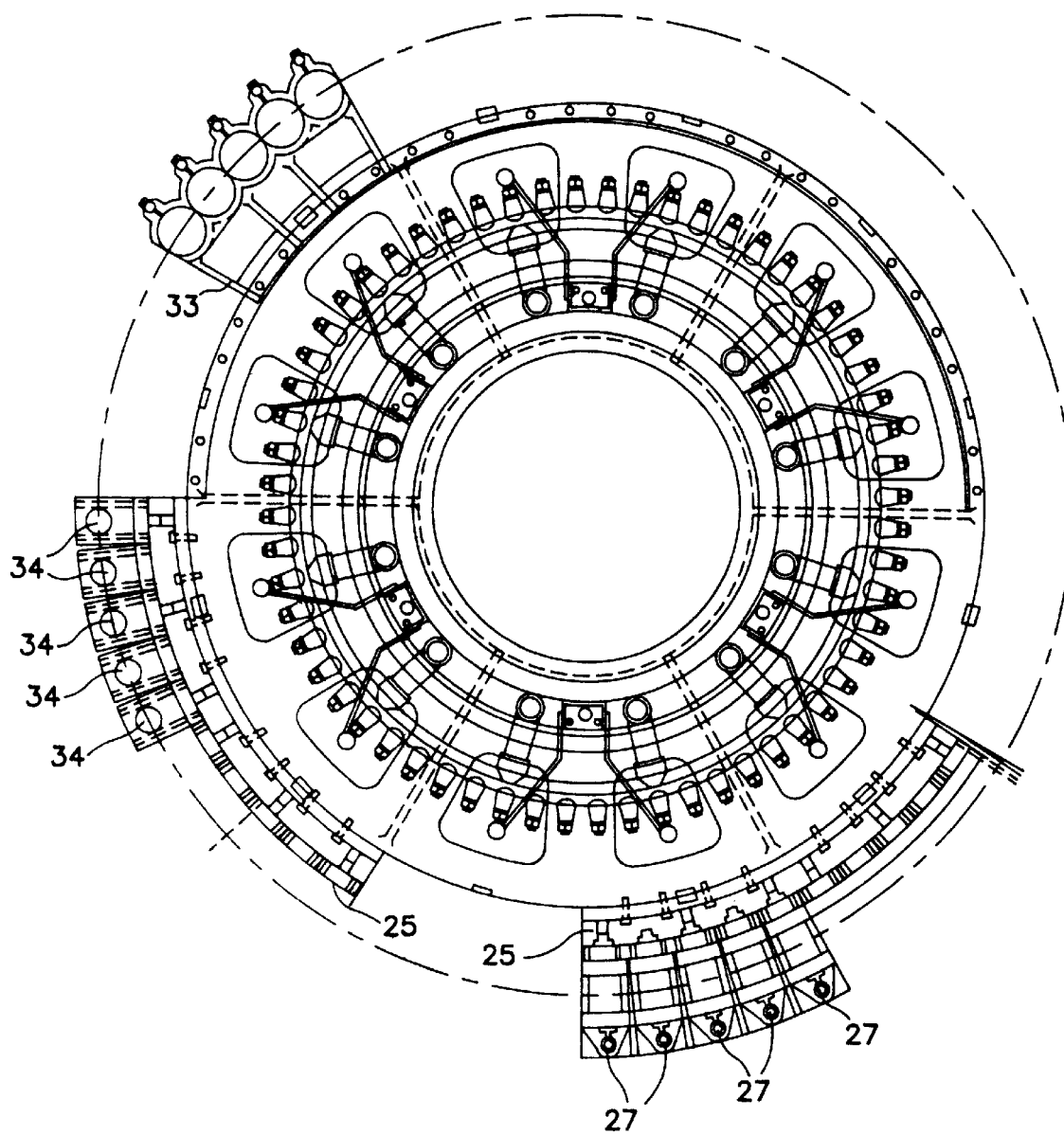
FIG. 5 is a partly diagrammatic horizontal sectional view.

FIG. 5 is a composite sectional view at various horizontal sections. In the lower left quadrant of FIG. 5, there is shown how a plurality of segments 25 are mounted on the turret and each supports the actuators 34 of five sets of upper tooling. In the lower left quadrant, there is shown how a plurality of segments 25 each supporting five sets of upper tooling 27 on the actuators. In the upper left quadrant there is shown how a plurality, shown as five, of the actuators 52 of lower sets of lower tooling 28 are provided on segments 33. Thus, if it is desired to vary the size or number of sets of tooling, the segments can support more or less sets depending on the size.

During normal operation, the molding force control is achieved with minimal compression of the gas cylinder, for example, on the order of 0.030 in. This control is maintained despite small variations in the volumetric capacity of the closed molds, and despite small variations in the weight of the delivered pellets. On the occasion of inadvertent loading of double pellets into a particular mold tool or due to incorrect setting of the mean pellet weight delivery for the particular mold, then the gas cylinder within the affected tooling will individually compress to absorb the additional stroke of the cavity and could compress to limit the molding force to an amount as preset by the gas system pressure up to an amount, for example, of approximately 0.500 in. If the pellet weight is outside the specified range for the part being molded, then the resulting part will be defective, but the machine loading will be limited by the molding force control described above, and thus machine damage will be eliminated.

Further, inasmuch as the cylinders within the tools are linked by a common system, and inasmuch as the system volume is much greater than the change in volume of the system during normal forming operation, (in excess of 1000:1) then the system pressure is substantially constant and each tooling is consequently controlled to the same preset molding force.

Thus, each set of tooling is controlled fully throughout the molding cycle since the same predetermined force is applied to a set of tooling at all times. In addition, each set of tooling is controlled without adversely affecting adjacent or other sets of tooling.

The advantages of the present invention can thus be summarized as follows:

a) Precise force control is provided on each set of tooling.
b) The predetermined force is applied to each set of tooling during the forming and holding portions of each cycle.
c) The force is substantially constant at all times during forming.
d) The pressure control of one set of tooling does not adversely affect the pressure of any other cylinder.
e) The use of separate actuators which eliminates side load on the upper tooling.
f) The ability to readily change molding tooling.
g) The ability to readily change the number and size of tooling to form articles of various sizes and weights.
h) The use of continuous cams which require minimal maintenance.

Figure 15:
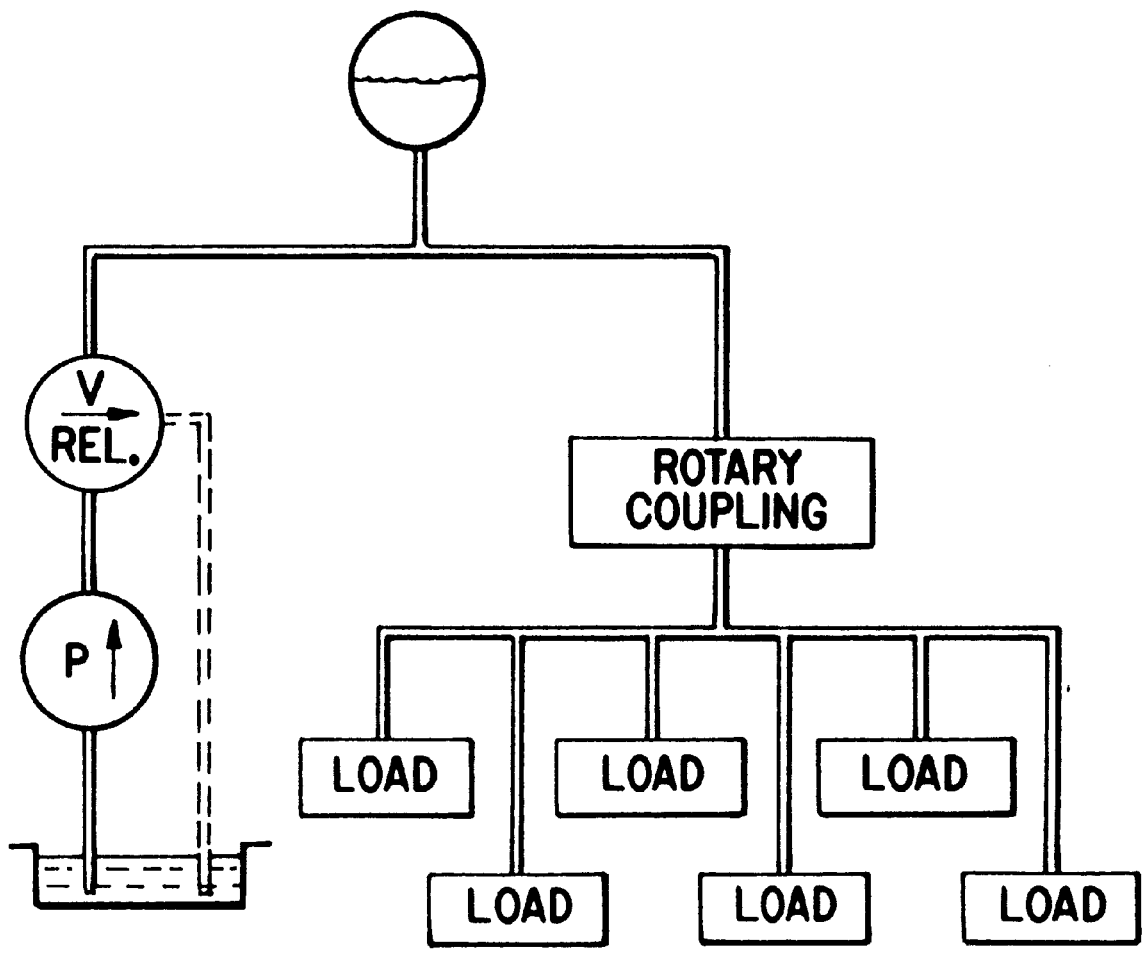
FIG. 15 is a schematic diagram of a modified system.

Although in a preferred form gas cylinders are provided, in accordance with another aspect of the invention the cylinders may comprise hydraulic fluid cylinders supplied through a rotary coupling as shown schematically in FIG. 15. The hydraulic cylinders designated as LOAD are connected through the rotary coupling to a gas pressurized accumulator and the system is supplied with oil from a low volume pump with an adjustable pressure limiting valve. The gas charged accumulator provides for rapid changes in system volume as a result of piston displacement within the respective cylinders and avoids the need for a larger volume pump. If the gas charged accumulating is of sufficient capacity, then the resulting pressure control within the system would be substantially constant.

This system could function in a similar manner to the preferred form of the invention and the pressure could be remotely controlled by using a servo pilot operated pressure relieving valve. However, it has a disadvantage in situations where possible oil contamination is a concern.

Hydraulic systems without the gas charged accumulator would not be as effective as the preferred form of the invention as the hydraulic fluid is substantially incompressible and cannot be controlled or function as effectively as a gas system wherein the fluid is compressible.

It can thus be seen that there has been provided a method and apparatus for compression molding plastic articles including closures wherein the forming pressure can be accurately controlled; wherein the forming pressure can be readily adjusted; wherein lateral forces on the tooling are not applied directly to the forming tool; wherein the tooling may be readily replaced; wherein the number and size of tool stations can be readily changed; and wherein various kinds and sizes of articles including closures can be readily made by changing the tooling and associated actuating mechanisms; wherein the tooling will compensate for variations in pellet or charge weight, variations in mold tooling volume in the closed mold position and wherein a substantial overload such as a double charge of plastic can be readily absorbed without overloading the tooling or the overall apparatus.

FIGS. 16–21 shows a modified form of upper and lower tooling useful in making closures and the like to accommodate variations in charges and provide for distribution of any additional material to a specific portion of the closure. In such tooling, the lower tooling 28a is supported on actuator 52 and comprises a female mold assembly 51b comprising a spring loaded outer or peripheral part 51c and an inner portion 51d supported and acted upon by a nitrogen gas cylinder 39, which functions in the same manner as the nitrogen cylinder 39 described in connection with FIGS. 1–15. The outer portion 51c is cooled by a cooling water manifold 51e and the inner portion 51d is cooled by a cooling water manifold 51f. The lower tooling assembly 28a is removably mounted on the actuator 52 in the same manner as the first form as described with reference to FIGS. 12 and 13.

Figure 19:
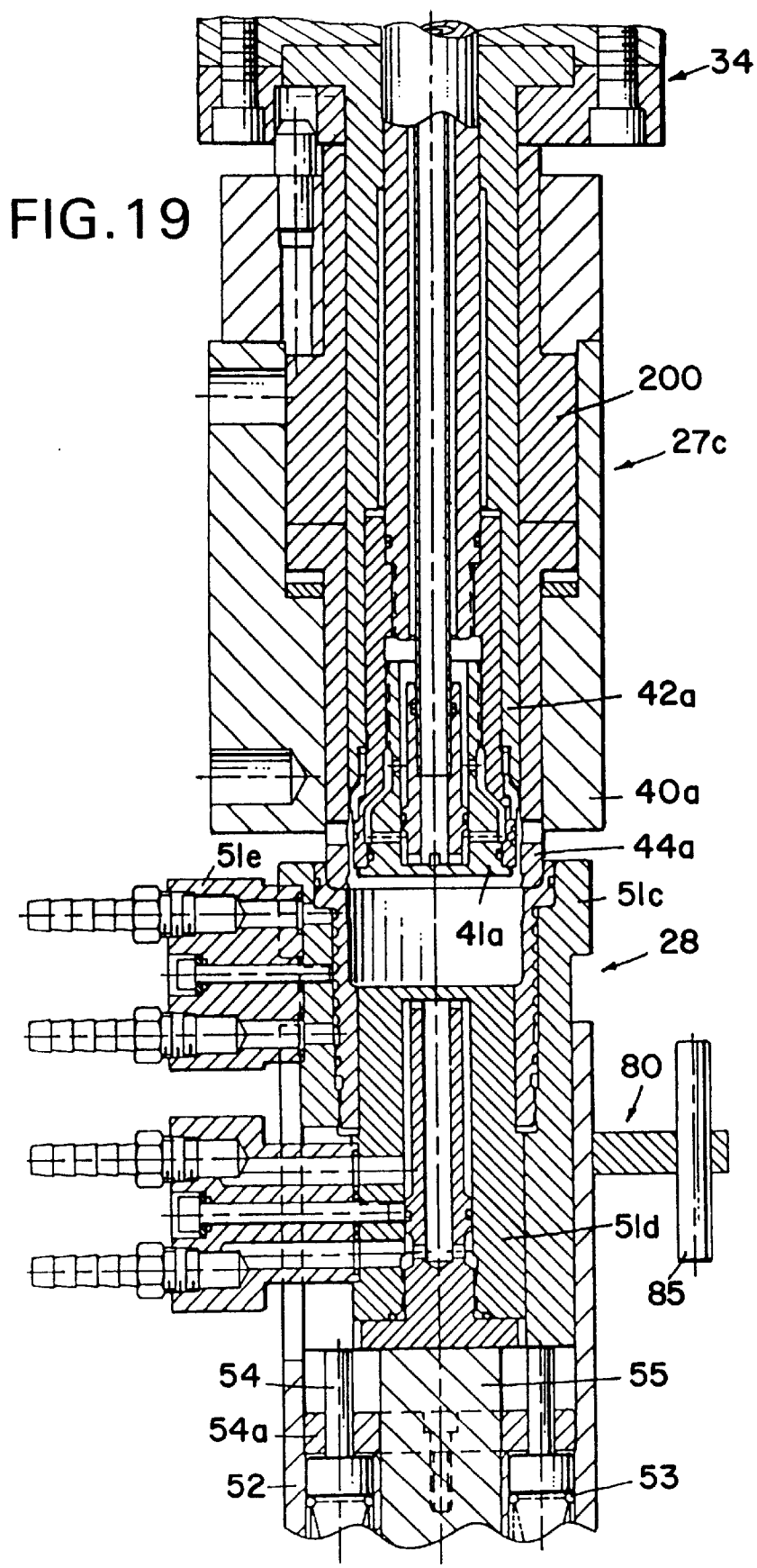
Figure 20:
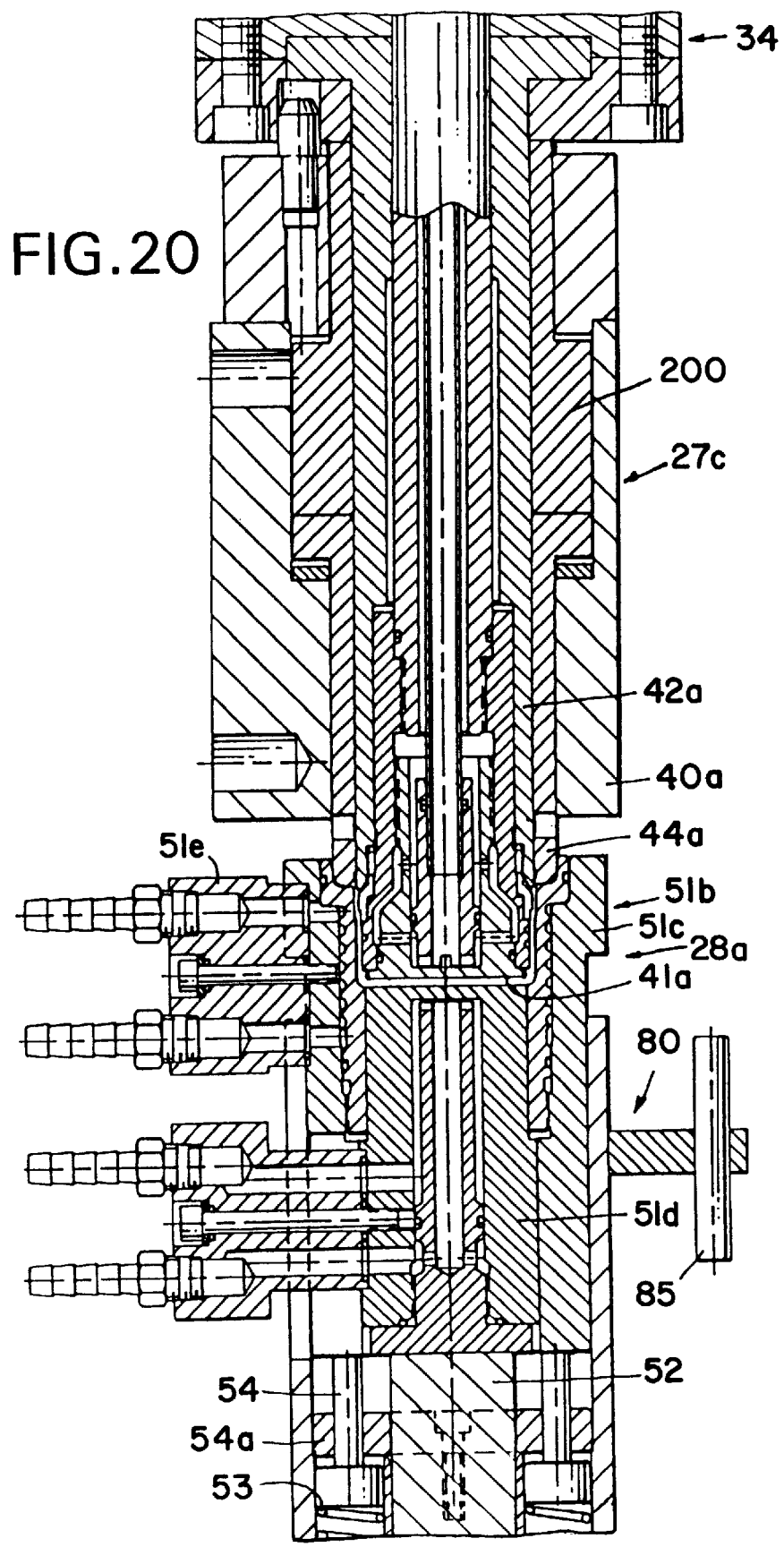

In this form, the upper tooling assembly 27c has no stripper sleeve springs, as in the form shown in FIGS. 6–11, and the stripper sleeve 44a is free to float in an axial direction within the restraints, as presently described. As shown in FIGS. 19 and 20, the upper tooling 27c provides for limited movement between the actuator 34a and the stripper sleeve 44a. A shoulder on core sleeve 42a limits the maximum downward position of the core sleeve 42a relative to the stripper sleeve 44a such that the relationship between the core sleeve 42a and the cavity 51b is also limited.

The tooling actuators 34 and 52 are identical and common to all forms of tooling. In this form, the inner portion 51d forms the top of the closure and slides within outer portion 51c which forms the side of the closure. The outer portion 51c is separately spring loaded within the actuator 34 by the similar array of springs 45 as described in the form of tooling shown in FIGS. 6–11. The inner portion 51d is resting on the plunger 55a as does the one piece cavity of style of tooling shown in FIGS. 1–15. The actuator 34 strokes are the same as actuator 34 in that form.

Figure 28:
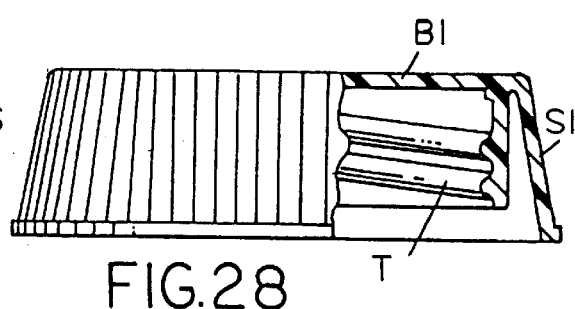
FIG. 28 is a part sectional view of another type of plastic closure.
Figure 29:
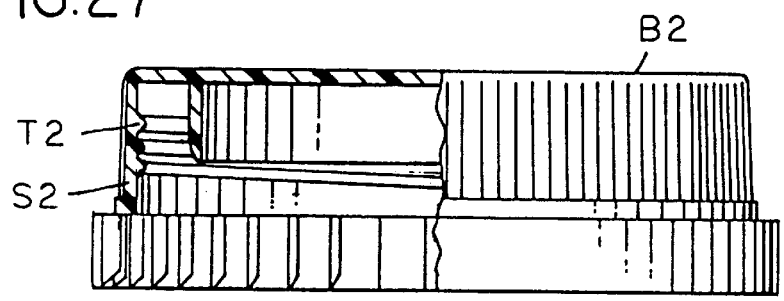
FIG. 29 is a part sectional view of another type of plastic.

A typical plastic closure that can be made by the tooling shown in FIGS. 16–21 is shown in FIG. 28. Such a closure comprises a base wall B and a peripheral skirt S having internal threads T and may be of the type shown in U.S. Pat. No. 5,265,747 incorporated herein by reference. The liner L is added to the closure after it is compression molded.

Operation

Referring to FIGS. 16–21, the operation comprises the following steps:

Position #1 Open

Figure 16:
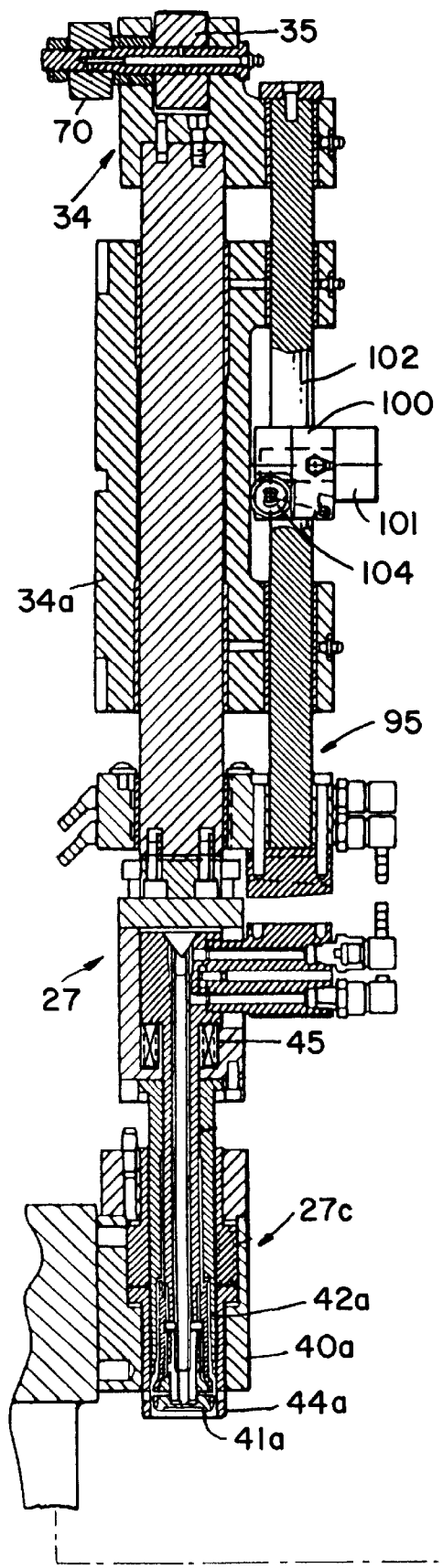
FIG. 16 is a vertical sectional view of a modified set of upper and lower tooling.
Figure 16:
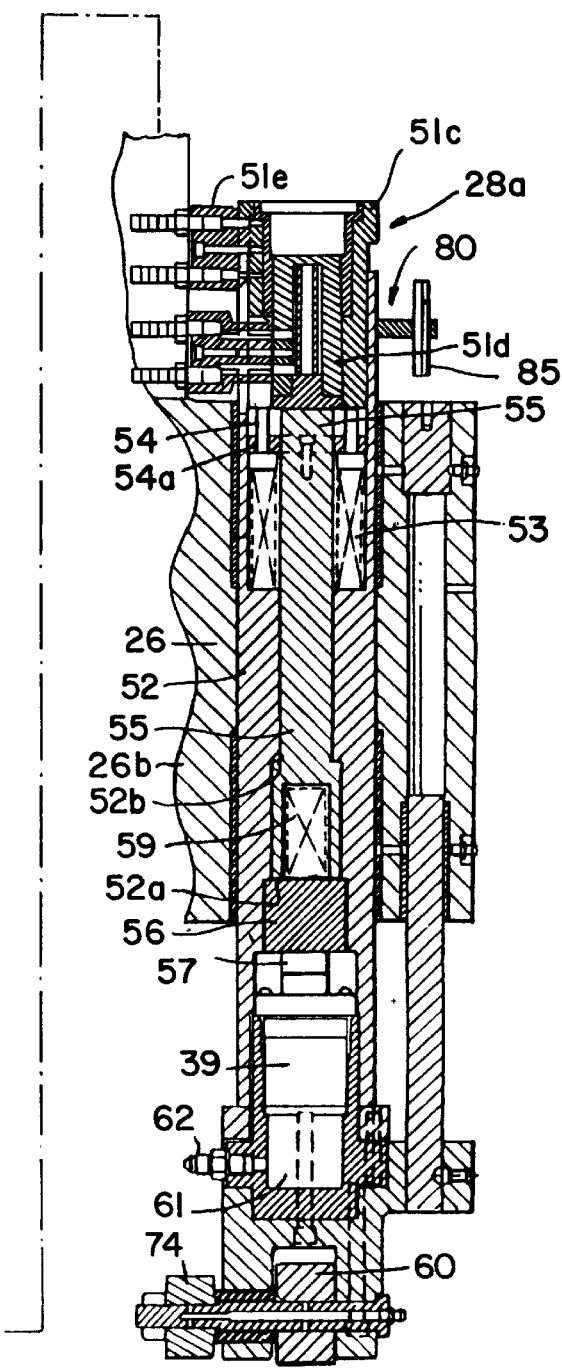
Figure 17:
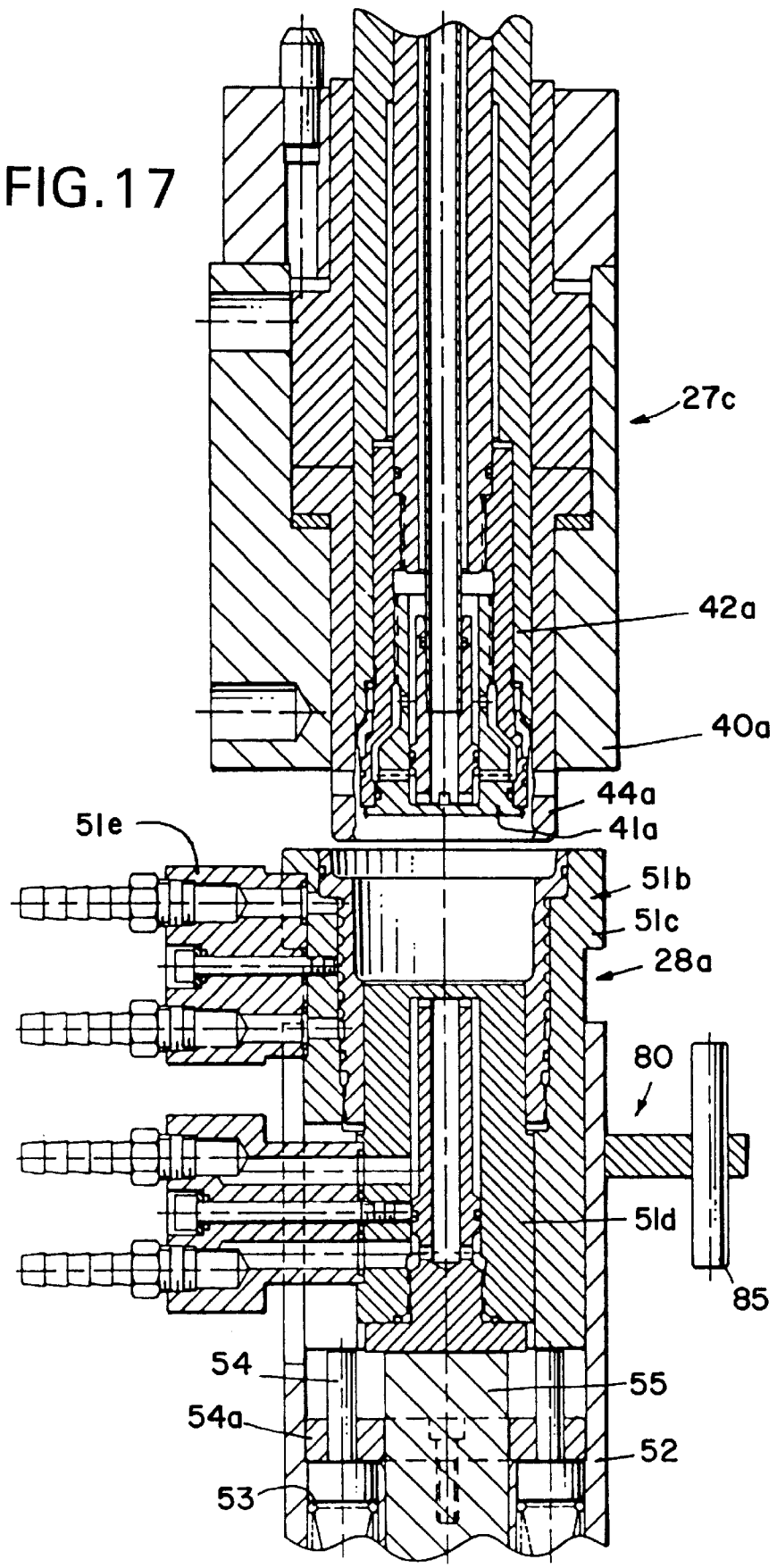
FIGS. 17–21 are fragmentary sectional views of the tooling shown in FIG. 16 during various stages of compression molding.
Figure 18:
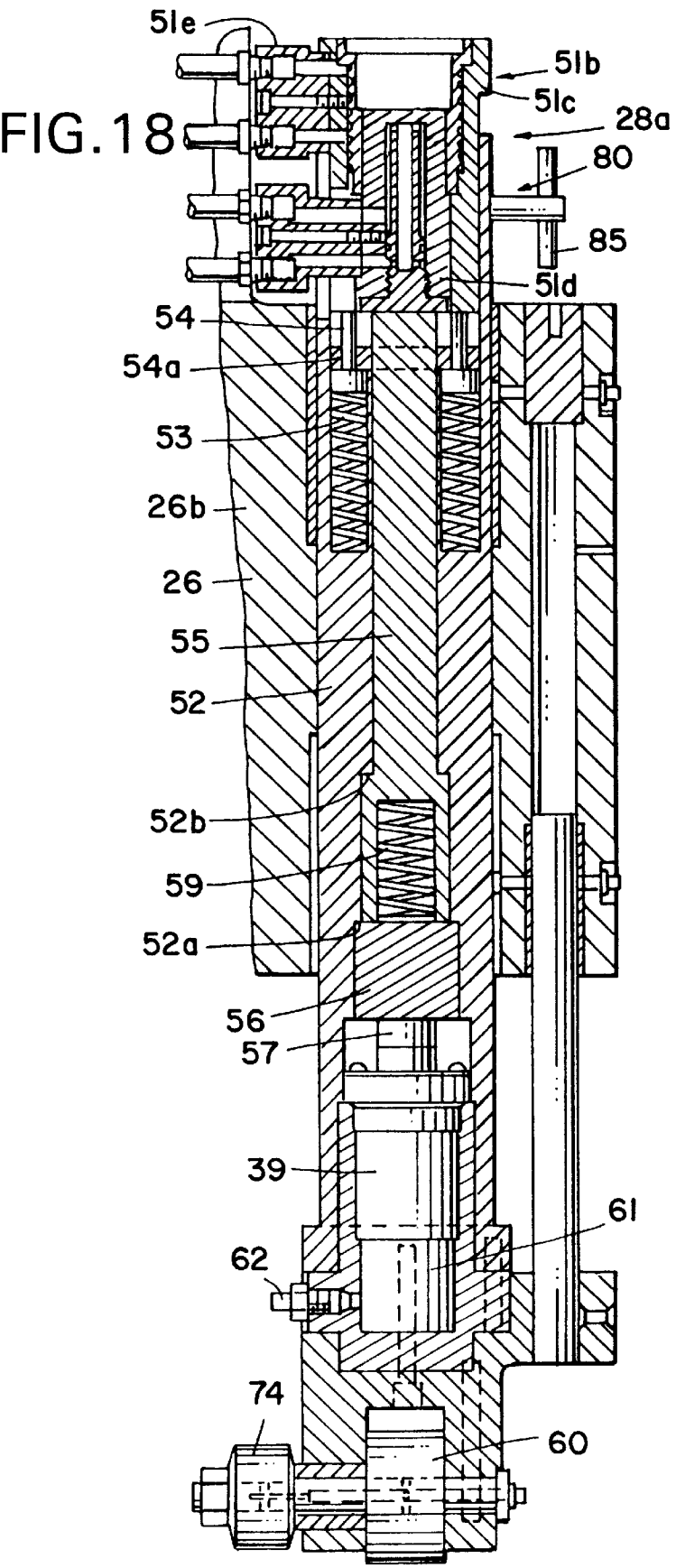

FIGS. 16 and 17 illustrate the tooling in the open position.

Position #2 Alignment

The cavity 51c is advanced upwardly to the stripper sleeve 44a by a fixed stroke and lifts the stripper sleeve 44a until the stripper sleeve 44a reaches its upper limit of travel. At this time, the stripper sleeve 44a and the outer cavity portion 51c are resisted from movement and the cavity springs 45 are compressed for the remainder of the lower tooling stroke.

Position #3 Molding

The upper tooling 27c is then lowered a fixed stroke to form the closure, the limiting mold is reached, the nitrogen cylinder 39 is compressed, allowing the inner cavity portion 51d to move downward until the upper tooling stroke is completed (FIG. 20). Simultaneously, the core sleeve 42a makes contact with the upper surface of the stripper sleeve 44a (FIG. 20) and moves the outer cavity portion 51c down compressing the outer cavity springs 45 (FIG. 20).

Figure 21:
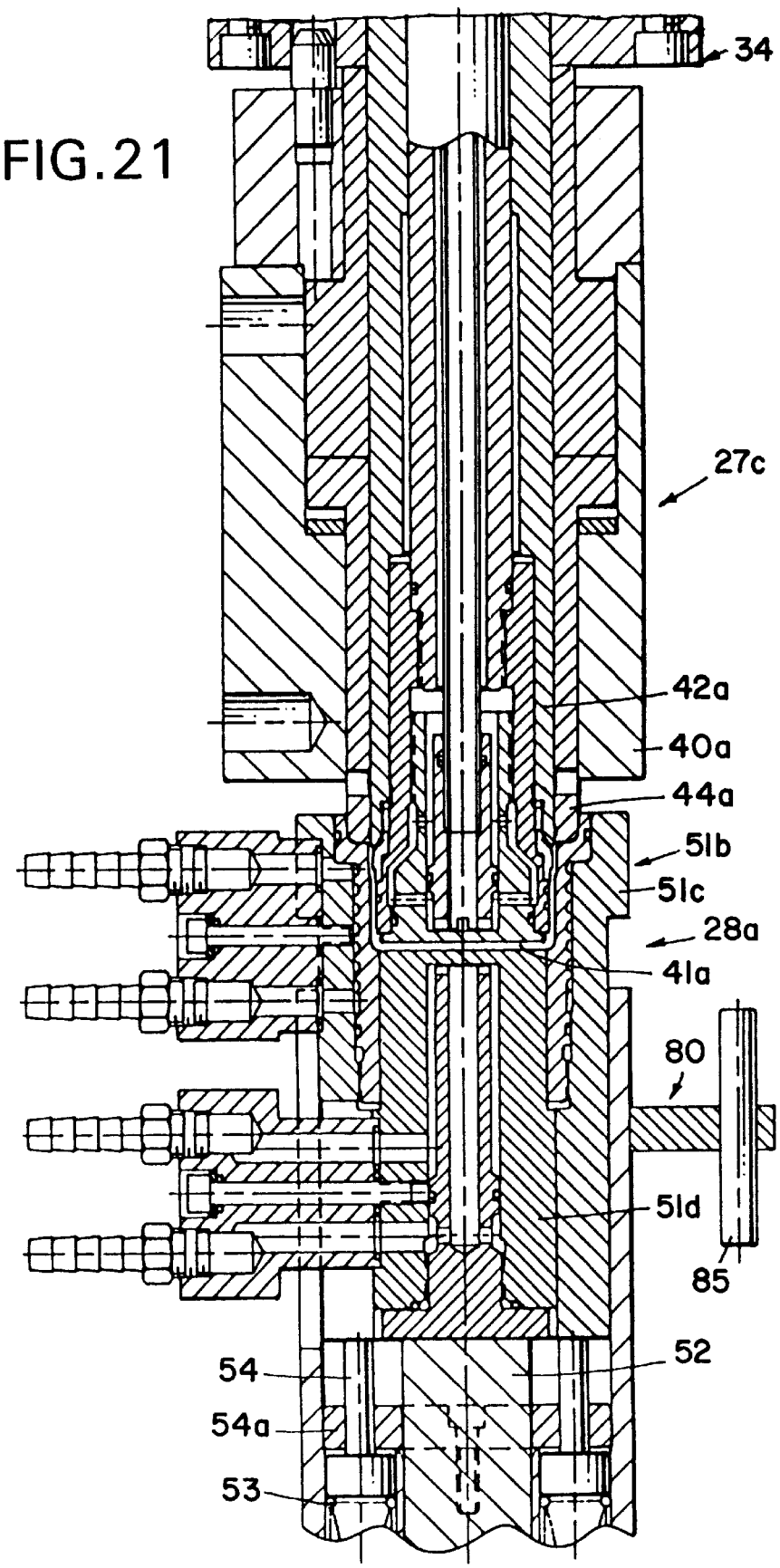

At the completion of the forming stage, the core sleeve 42a, stripper sleeve 44a and outer cavity portion 51c are at a fixed axial relationship (FIG. 21). This does not vary with variations in material weight. This is a major advantage of this method.

Position #3 Holding

This is accomplished through the parallel sections of the cams under control of the nitrogen cylinders. No relative movement takes place during this phase.

Position #4 Lowered Holding Force Section

A step up in the upper cam (as in shown in FIGS. 1–15) causes the upper actuator 34 to rise as it is lifted by the nitrogen cylinder. The outer cavity portion 51c is, in turn, lifted by its array of springs 53 as the stripper sleeve 44a is allowed to move up with the core sleeve 42a. The spring plug 56 limits the outward stroke of the nitrogen cylinder. The inner cavity is now held up by the much reduced force of the smaller spring 59a in the cavity holder plunger 55, in opposition to the weight of the upper tooling 27c and the upper actuator 34a.

Position #5 Cavity Strip

During stripping, the lower tooling actuator 52 is lowered, leaving the closure on the molding core. The stripper sleeve 44a remains aligned with the closure skirt and it has no opposing springs.

During the retraction of the core sleeve 42a, the stripper sleeve 44a is already at its limit of travel. At this time, the stripper sleeve 44a acts to strip the closure as the core sleeve 42a continues to retract, withdrawing the core 41a. As there are no stripper sleeve springs, the stripper sleeve 44a does not have a snap action and the resulting smooth stripping action occurs.

This form of method and apparatus provides the desirable control of the molding force to tolerate variable changes of material and to accommodate potential overload of the machine and tooling resulting from an excessive charge of plastic being trapped within the closing tooling. Further, the method and apparatus provides that the compensating means will not affect the axial relationship of the male and female components of the mold in the case of normal variation of the plastic charge. As presently described, the method and apparatus is useful for a tooling action to produce a molded in bridge or reduced section for a tear away band when molding by the compression molding process. The split cavity of the method and apparatus accomplishes these objectives by allowing the inner cavity to move when sufficient molding force is generated to compress the nitrogen cylinder against the preset system pressure.

In summary, this form of method and apparatus has the following advantages:

1) Use of two piece cavity construction whereby the inner portion is axially slidably connected to an outer portion and whereby the inner portion engages a fluid powered cylinder, preferably nitrogen powered, such that molding force is constant throughout the molding operation and preferably is controlled by a common system pressure applied to the cylinder and all other cylinders in adjacent toolings.

2) The apparatus wherein the lower tooling actuator including the nitrogen cylinder and the cavity actuating means are interchangeable with the two main tooling styles described above; both the split cavity as described here and the one piece cavity as described above and in the aforementioned application Ser. No. 08/473,479, incorporated herein by reference, without any adjustment or changing of parts other than the wetted mold surfaces and their individual assemblies.

The tooling can also be configured to form a closure which is more complex such as having a thinner portion, or a double wall or being of the tamper indicating type. In the tooling shown in FIGS. 22 and 24–26(A–C), the upper tooling and lower tooling are designed to form a part such as a double wall or tube closure shown in FIG. 28. Such a plastic closure comprises a base wall B1, an inner peripheral wall I having an internal thread T1 and an outer peripheral wall or skirt. The construction of this form of tooling is similar to that of the form shown in FIGS. 16–21, corresponding parts being provided with suffixes as indicated. In this form, the upper tooling differs from that described in the form shown in FIGS. 6–11 and FIGS. 16–21 in utilizing an auxiliary actuator.

Figure 23:
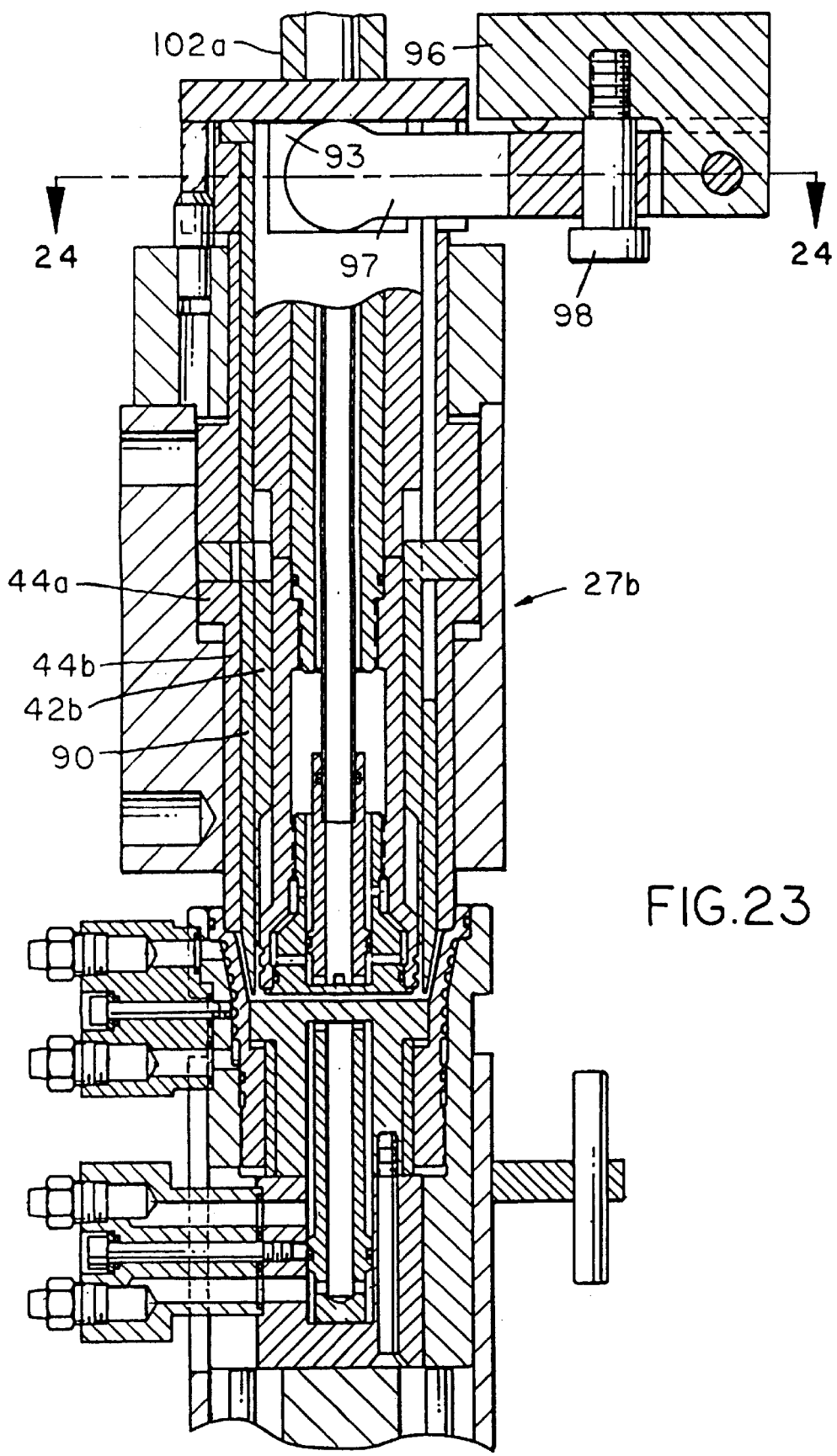
FIG. 23 is a fragmentary sectional view on an enlarged scale of a portion of a modified from of the tooling shown in FIG. 22.

As shown in FIG. 23 the upper tooling 27c consists of a movable assembly 27d and a fixed assembly 27e as in the previous forms. However, the upper tooling includes a second sleeve 90. The upper tooling includes core sleeve 42, core 41, and a stripper sleeve 44b. Sleeve 90 is interposed between the stripper sleeve 44a and the core sleeve 42a. The stripper sleeve 44b and core sleeve 42a form two annular spaces 91, 92 for forming the plastic to define two cylinders concentrically mounted.

Inner sleeve 90 is moved axially within the annular space within the stripper sleeve 44b and has groove 93 on its upper end by which an external actuator 95 (FIGS. 22 and 23) can contact the sleeve 90 and impart the desired linear motion of the inner sleeve 90 relative to the stripper sleeve 44b. The downward movement of the inner sleeve 90 relative to the stripper sleeve 44b is limited by a shoulder on the inside of the outer cylinder of the stripper sleeve 44b which engages a mating shoulder on the outside of the inner sleeve 90. A compression spring 99 is loaded against an actuator fork 96 and provides a downward limiting force on the inner sleeve 90 against the stripper sleeve 44ab when in its free condition. Actuator fork 96 includes a body having two forked projections 97. The actuator fork 96 is attached to the auxiliary actuator 95 and, in turn, contacts the inner sleeve 90 of the tooling via the said grooves (FIG. 23). The actuator fork 96 is connected to the actuator 95 by a pivot pin 98 and has limited pivotal movement, being restricted by the shoulder bolt 98a in a downward direction and by spring loaded plunger 99 in the upward direction.

The core 41c is directly connected by a quick release coupling to the main upper actuator 34 and moves in unison with the actuator 95. It can be seen that downward axial actuation of the auxiliary actuator 95 will impart a motion on the inner sleeve 90 under control of the spring 99 until the inner sleeve movement is limited by contact with the stripper sleeve 44b. The spring 99 provides a limiting force on the inner sleeve 90 by insuring a lost motion connection between the actuator fork 96 and the inner sleeve 90 allowing for a machining and assembly tolerances of the cams and the actuators.

Figure 22:
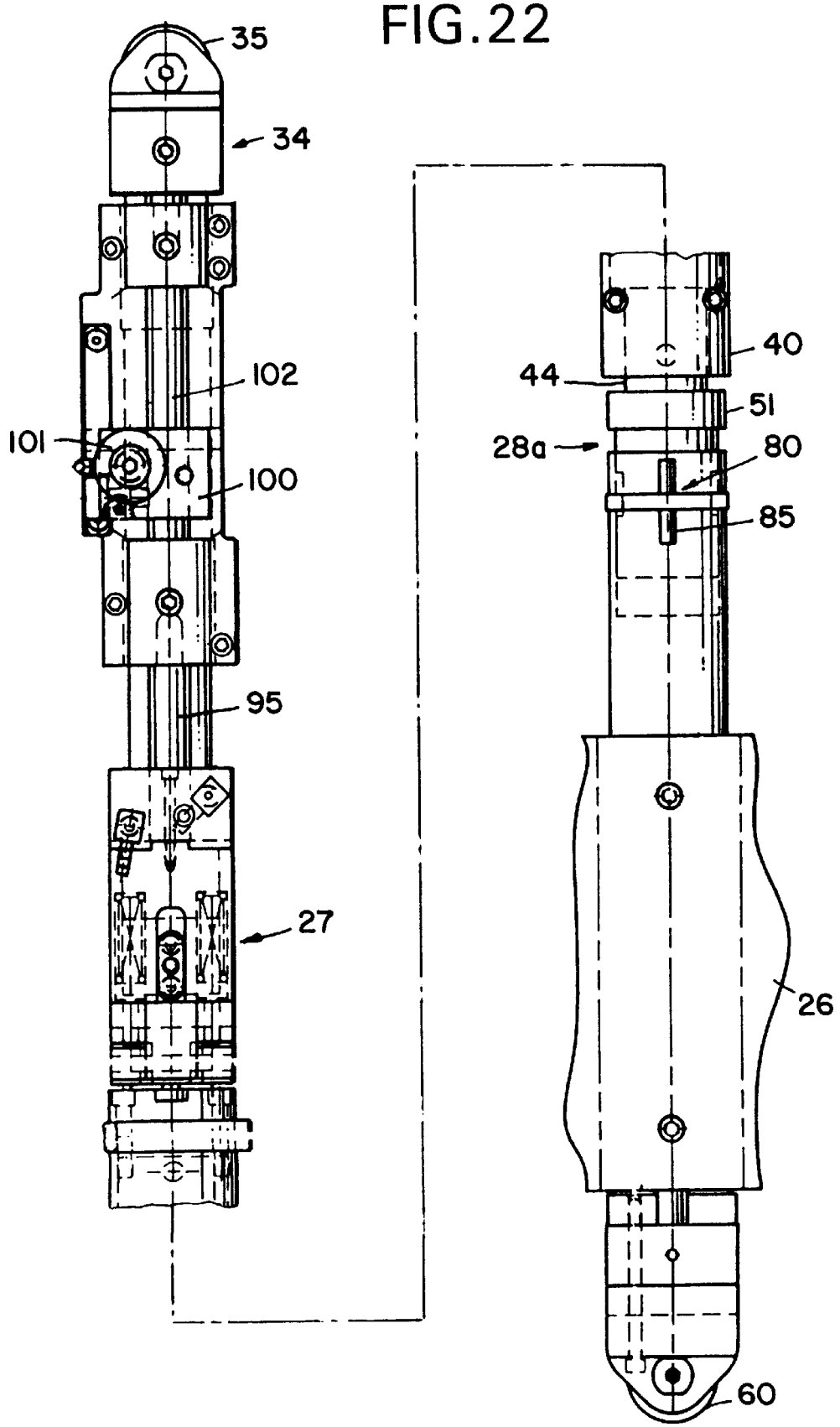
FIG. 22 is a side elevational view of a portion of the tooling.
Figure 24:
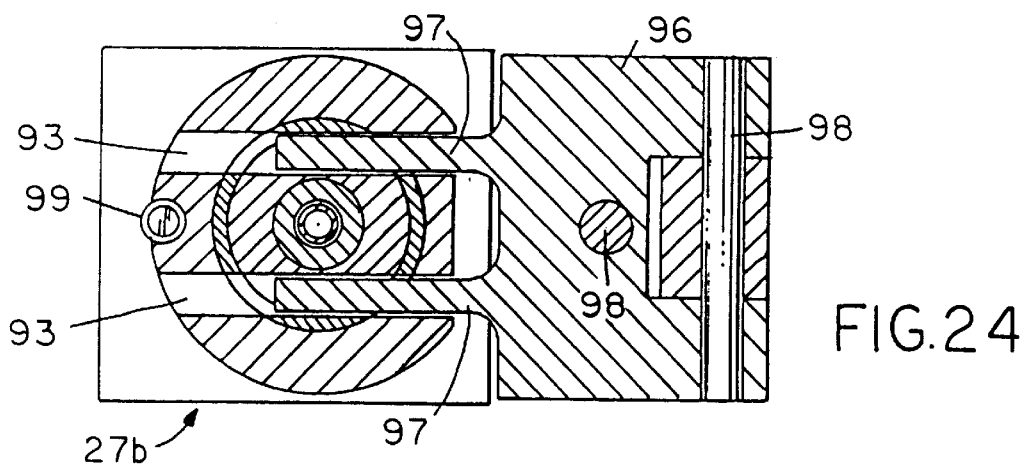
FIG. 24 is a sectional view taken along the line 24—24 in FIG. 23.
Figure 27:
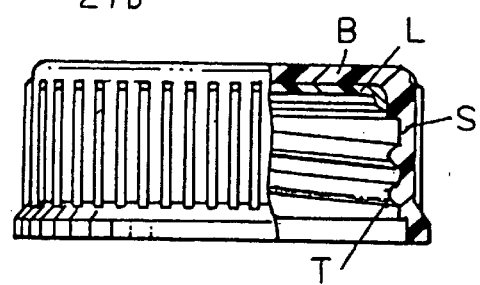
FIG. 27 is a part sectional view of one type of plastic closure.
Figure 25:
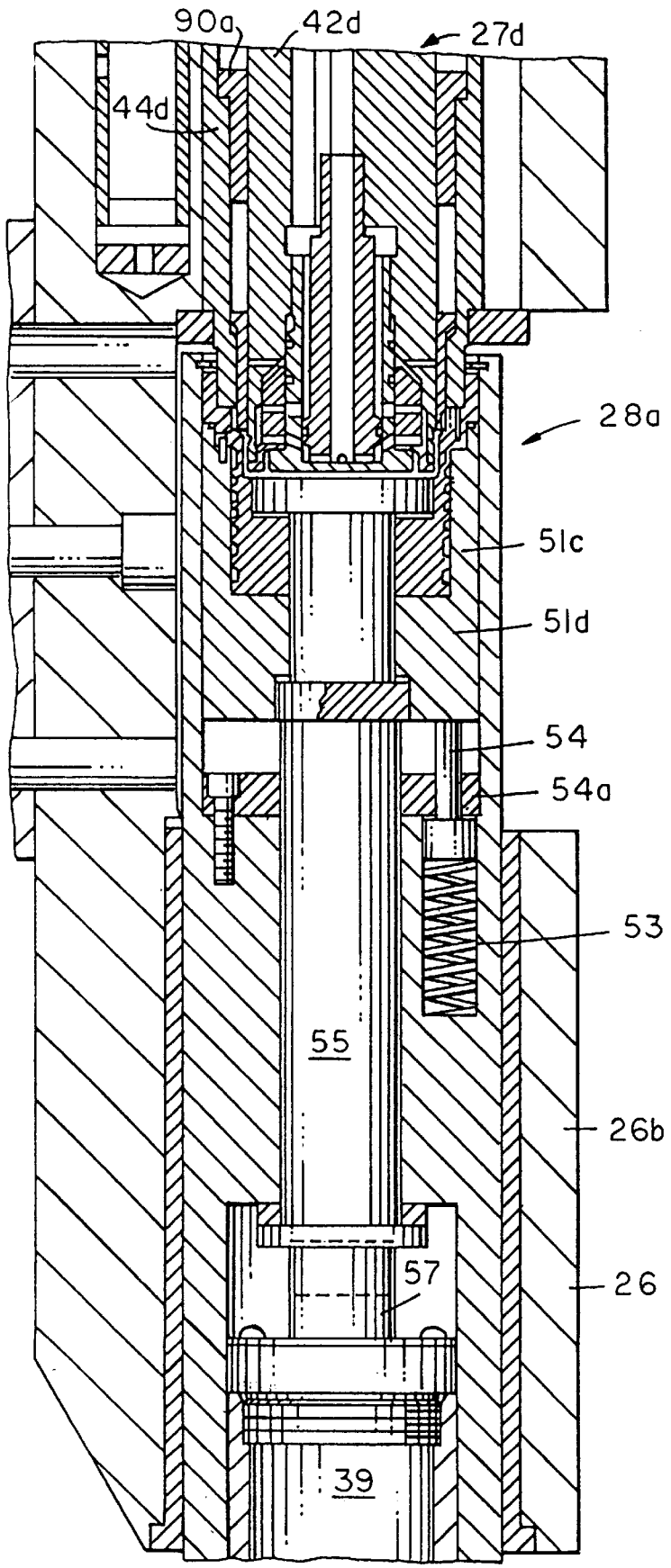
FIG. 25 is a fragmentary vertical sectional view of a further modified form of tooling.

The auxiliary actuator 95 when raised lifts the inner sleeve 90 to its desired position. Referring to FIGS. 22 and 24 and 25, both the main upper actuator 34 and the auxiliary actuator 95 are bearing mounted within the same upper actuator bracket. They are axially displaced and parallel and can slide axially independently. The auxiliary actuator 95 has a cam follower bracket 100 attached to its approximate mid position, and a cam follower 101 is attached to provide actuation of the shaft 102 by an external cam 103. The upper end of the auxiliary actuator shaft 102 is also slidingly engaged by a bearing to the main actuator 34 and the lower end of the auxiliary shaft 102 is pinned to the cooling block 105. The cooling block 105 is also bearing mounted onto the main actuator in sliding contact. It can be seen by this arrangement that the two shafts 34, 102 are able to move axially independently from each other but do not rotate within their bearings and are held rigidly without the use of special shaped guides or keyways or other means. The cooling block 105, as well as providing anti rotation to the auxiliary shaft, also serves as a distributor manifold for the cooling water, and provides a transition of coolant from the confined interior of the machine to the easily accessible exterior of the machine for easy disconnection of tooling coolant lines via quick disconnected couplings. The cam follower bracket 100 has a second cam roller 104 bearing mounted at right angles to the cam engagement roller 101 and this provides a secondary supporting of the auxiliary shaft 102 against the reaction force from the cam roller 101. The auxiliary actuator cam track 103 is machine mounted and can be attached for engagement during rotation of the turret. Alternatively, the cam can be positioned in local areas where actuation is required. By removing cam sections and replacing them with cams of different profile, the actuation of the auxiliary actuator 95 can be varied.

The lower tooling is constructed using the split cavity concept described in connection with FIGS. 16–21. In operation, the auxiliary actuator 95 is lowered to move the inner sleeve 90 into contact with the stripper sleeve 44b and, as the tooling is rotating with the turret, the lower tooling is raised by cam action to engage the stripper sleeve 44a compressing the outer cavity springs 45. The general sequence of operation follows as described in connection with the split cavity form shown in FIGS. 16–21.

The upper tooling is lowered a fixed stroke to form the part. Toward the end of its stroke, the inner cavity is deflected against the nitrogen cylinder. Thus, the molding force is limited and the variance in material is accommodated in the thickness of the upper panel. Toward the end of the mold cycle and prior to the unload sequence, the auxiliary actuator 95 is lifted by cam action and the inner sleeve 90 is withdrawn from the molded part, thus allowing the stripping of the inner threaded portion of the closure from its mold surface, while providing stripping force through both the inner and outer walls of the closure, thus avoiding part distortion. This stripping is accomplished by the withdrawal of the core 41b by raising the main upper actuator 34. The core 41b may be configured to form retention beads or other features as well as or instead of threads.

This form of method and apparatus thus enables the compression molding of certain types of closures or articles such as double wall closures and utilizes a number of tooling sleeves which need independent actuation. Often, to allow stripping of closures or to manufacture a closure with a double wall, requires that the stripping force is applied to both the inside portion of the closure and to the outside wall of the closure to prevent the closure from collapsing. In the case of the tube closure, a secondary sleeve 90 is actuated by external means and operates in the annular space between the two stripping surfaces. The secondary sleeve 90 is preferably actuated independently of the main tooling stroke and is adjustable by the provision of external cams.

The external actuation can also be used as a substitute for the springs supporting the core pin in the case where larger diameters are involved and the core pin has more weight. Springs in this case are less sensitive and the stripping action could otherwise be impaired.

Thus, the method and apparatus provides an actuating means which is flexible to adapt to various tooling styles requiring upper tooling sleeve actuation.

Figure 30:
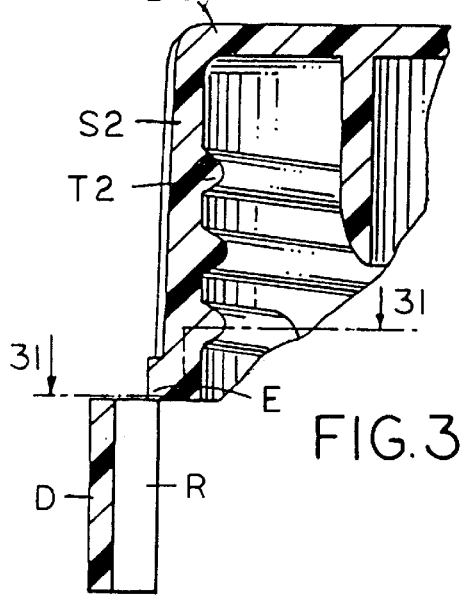
FIG. 30 is a vertical sectional view on an enlarged scale of the closure shown in FIG. 29.
Figure 31:
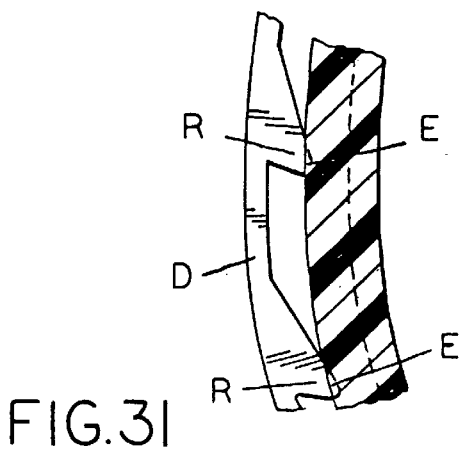
FIG. 31 is a sectional view on an enlarged scale taken along the line 31—31 in FIG. 30.

For example, a tamper indicating closure which includes bridges between a tamper indicating band and a plastic closure can be formed by compression molding. Such a closure is shown in FIGS. 30–31 and comprises a base wall B2, an inner annular plug P, an outer wall or skirt S2 having an internal thread T2. A tamper indicating band C has a plurality of ratchet teeth R on the inner surface and is connected to the wall S2 by integral bridges E. Such a closure is shown in U.S. Pat. No. 3,980,195 incorporated herein by reference.

Referring to FIGS. 25 and 26A, 26B and 26C, the tooling comprises a split mold cavity as in the other forms shown in FIGS. 16–22 and 24–26(A–C) and includes a secondary actuator 95, as in the form shown in FIGS. 22 and 24–26

(A–C). The lower tooling is substantially identical and corresponding numbers are used in the drawings. The upper tooling 27f includes a core 41d, a core sleeve 42d, and stripper sleeve 44d. A sleeve 90a is interposed between the stripper sleeve 44d and core sleeve 42d.

The cavity is a two piece (split) mold with a spring loaded outer cavity 51c and a nitrogen gas powered cylinder acting as a spring for the inner portion.

The sleeve 90a has a number of grooves 90b in its outside diameter to form a tamper indicating band with inwardly projecting teeth. The depth of the grooves 90b is such that the tip (E) of the tooth so formed in partially inward of the O.D. of the closure wall skirt, thus forming a frangible bridge of plastic between the tamper indicating band and the skirt of the closure.

Such tooling permits the plastic to flow freely to fill the mold cavity and then to form passage for forming the bridges.

Figure 26A:
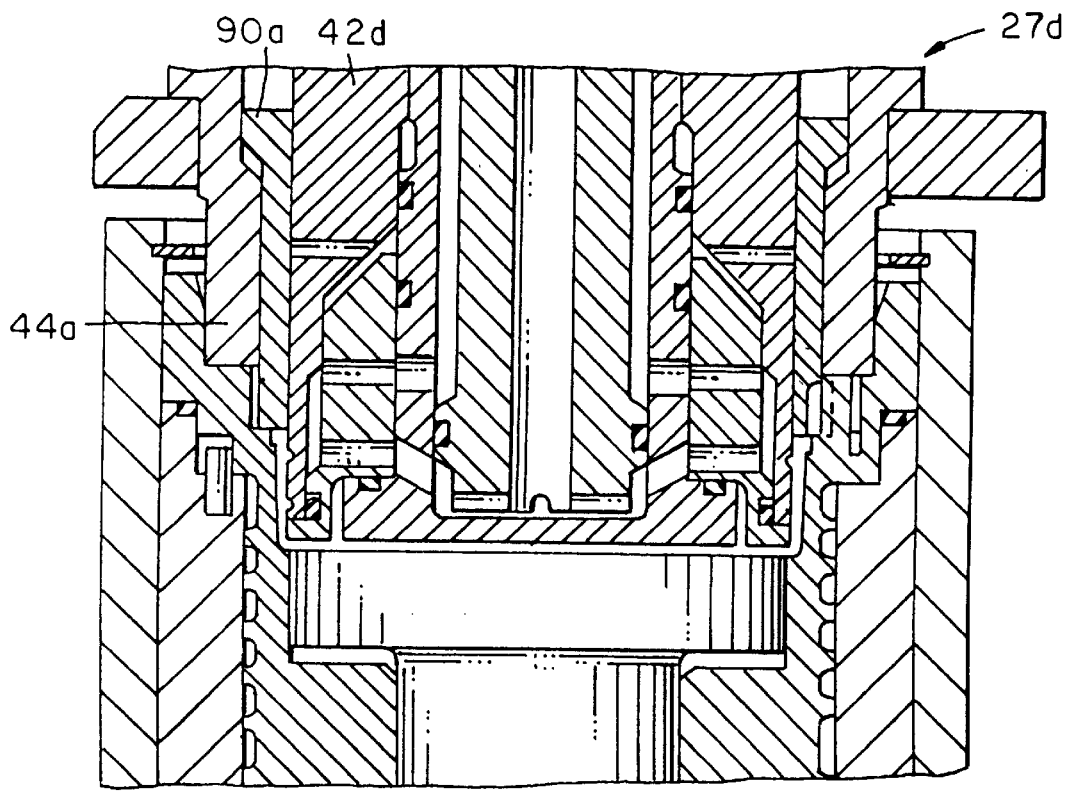
FIGS. 26A, 26B, and 26C are fragmentary sectional view showing the tooling of FIG. 26 during various stages of operation.
Figure 26B:
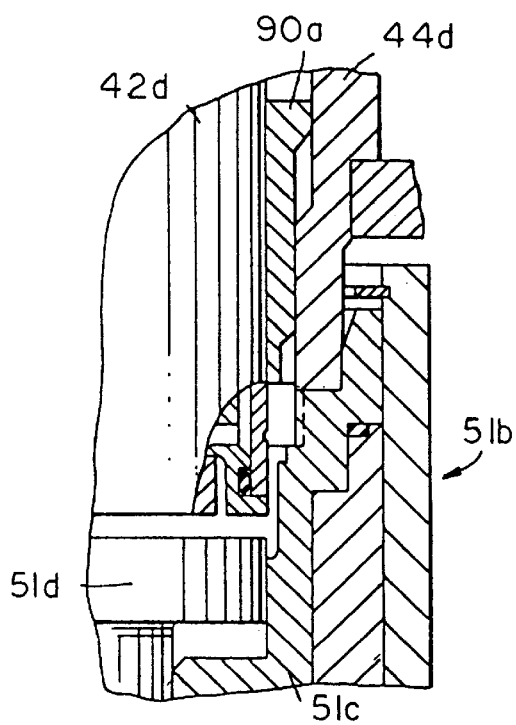
Figure 26C:
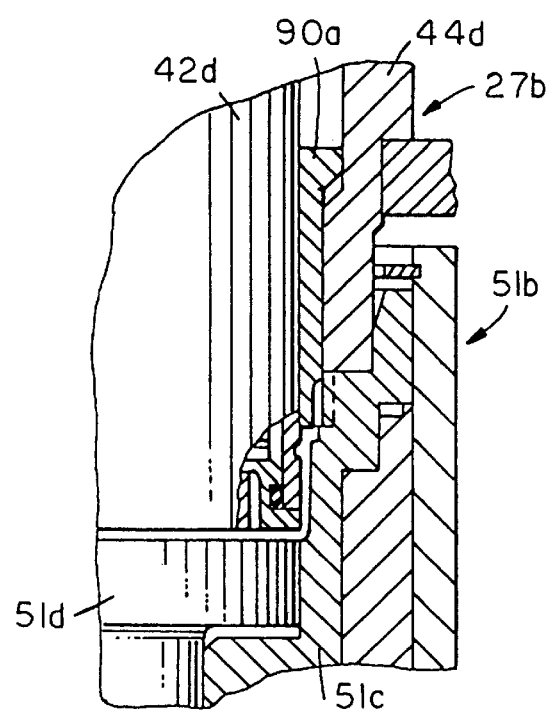
Figure 32:
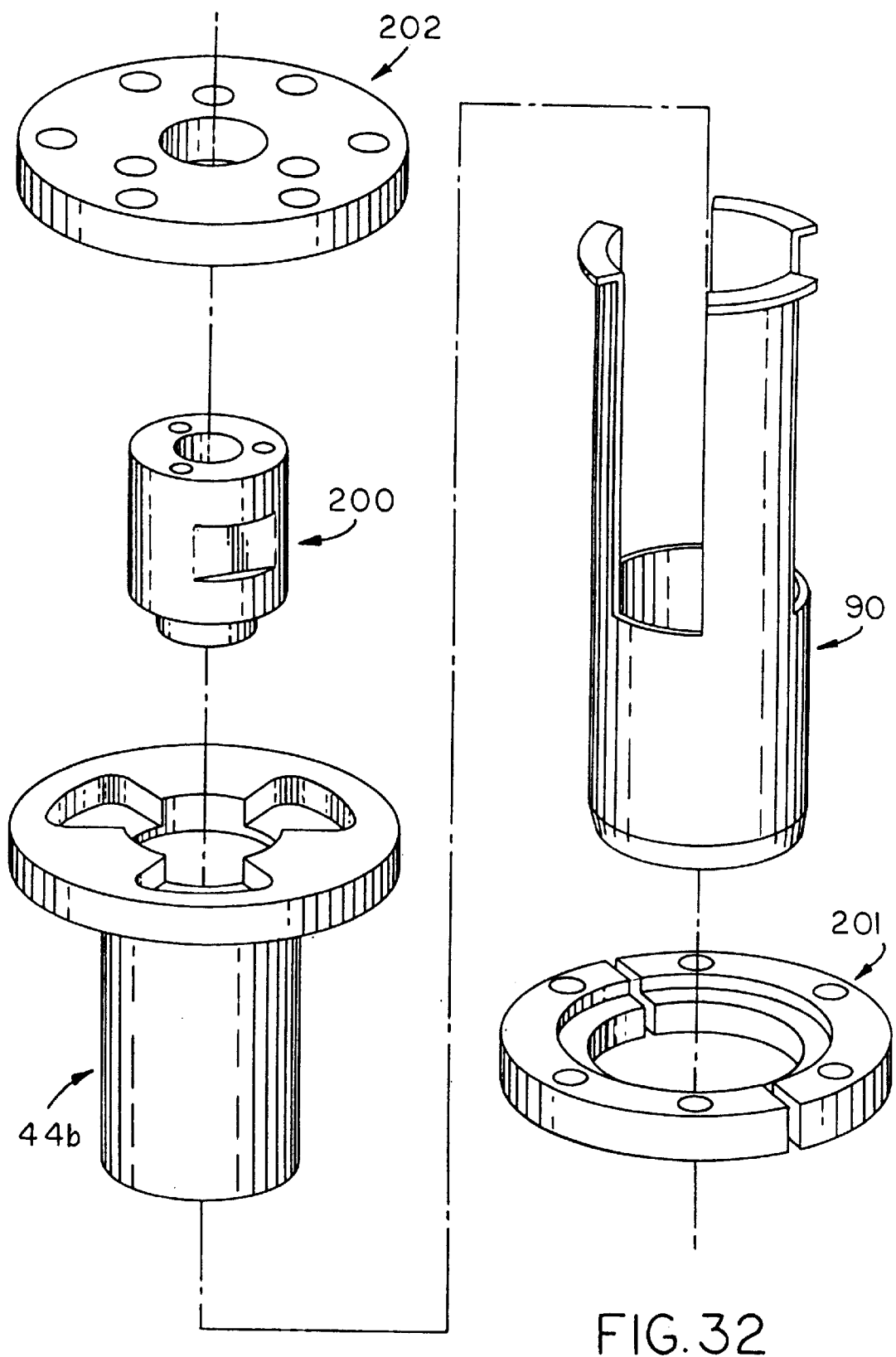
FIG. 32 is an exploded view of a portion of the tooling.

The operation of FIGS. 26A, 26B and 26C insures that the band will be filled prior to the completion of the upper tooling stroke by maintaining the inner cavity portion high under the force from the nitrogen gas cylinder.

This allows for the band to fill by bypassing the bridges as shown in FIG. 26B, and finally to form the material adjacent the bridges during the final stroke of the tooling as shown in FIG. 26C.

This form can be readily applied to form other closures such as a threaded milk top closure, and closures where the tamper band is retained outwardly relative to the thread.

For this reason, it is possible that the tooling shown in FIGS. 21 and 26A, 26B, 26C can be used in conjunction with the split cavity concept.

Thus the forms of tooling shown in FIGS. 16–21 and FIGS. 22 and 24–26(A–C) have the following advantages:

1) Use of an auxiliary actuator with an anti rotation means external and independent of any tooling members.

2) Use of an auxiliary actuating shaft for the manufacture of tube style closures or for other applications where more than one tooling sleeve is actuated independently of the remaining tooling components.

3) A method of actuating a tooling by means of dual actuating shafts whereby the two shafts are axially displaced from each other and in independent axial sliding connection with each other and where both shafts are restrained from rotation one by the other.

4) A method of operating an auxiliary actuating shaft whereby its axial relationship to the main actuating shaft is controlled by a cam track and this cam track is interchangeable for various desired tooling actions.

5) Tooling for compression molding of a tube style closure having a generally inner wall and a generally larger diameter outer wall or skirt separated by an annular space.

6) The cavity is a two piece (split) construction with a spring loaded outer portion and a nitrogen gas powered cylinder acting as a spring for the inner portion. The upper tooling consists of a spring loaded sleeve and a sleeve and molding core which each slide within the sleeve. The sleeve has a groove in its outside diameter to form a tamper indicating band under pressure.

It can thus be seen that there has been provided a method and apparatus wherein plastic articles such as plastic closures can be compression molded to accommodate variable charges of plastic material without affecting the axial relationship between the male and female components of the mold; wherein the closure has a base wal and two peripheral walls; and wherein the closure has a tamper indicating band of greater diameter than the peripheral wall of the closure and connected thereto by integral molded bridges.

I claim:

1. A method for compression molding a plastic article comprising providing a first upper tooling assembly having a male mold associated therewith, providing a second lower tool assembly having a cavity mold associated therewith, said cavity mold having a peripheral portion and an inner central portion having limited relative movement with respect to one another, said male mold and cavity mold having a configuration forming a closure which has a complex configuration, providing a first fixed cam associated with the first tool assembly and a second fixed cam associated with the second tool assembly for moving said tool assemblies toward and away from one another, providing a fluid cylinder comprising a fluid filled chamber and a piston associated with said second assembly, said inner central portion of said cavity mold being associated with said piston of said fluid cylinder such that there is limited permissible movement between said fluid cylinder and said associated tooling, connecting said fluid cylinder to a manifold to apply said fluid in said cylinder continuously at a predetermined pressure during full motion at said tool assemblies, providing a charge of extrudate to the cavity of the cavity mold, and moving the first and second assemblies relative to one another by said cams to move the first assembly and second assembly toward one another to close the mold and compress the charge to form an article.

2. The method set forth in claim 1 wherein said fluid cylinder is provided adjacent said cavity mold.

3. The method set forth in claim 2 wherein said fluid cylinder comprises a gas cylinder.

4. The method set forth in claim 2 wherein said fluid cylinder comprises a nitrogen cylinder.

5. The method set forth in claim 2 wherein said fluid cylinder comprises a hydraulic cylinder.

6. The method set forth in any one of claims 1–5 including providing an array of sets of first tool assemblies, associated second tool assemblies and associated fluid cylinders having the pressure therein maintained at said predetermined pressure, connecting all of said cylinders continuously to said manifold, moving said sets of tool assemblies successively in an endless path past a station wherein a charge of extrudate is delivered successively to a cavity mold, and thereafter moving said sets of tooling successively past the cams such that the cams cause the charge to be formed into an article.

7. The method set forth in claim 6 including sensing the pressure in said fluid cylinders and producing a signal and controlling said pressure in response to variation of the pressure signal from a predetermined pressure.

8. The method set forth in claim 7 including providing a rotary coupling between said source and said fluid cylinders.

9. The method set forth in claim 8 whereby said step for sensing said pressure is performed by sensing the pressure between said source and said rotary coupling.

10. The method set forth in any one of claims 1–5 wherein said first tool assembly comprises a plunger and said second tool assembly comprises a cavity for forming a closure having a base wall and a peripheral skirt.

11. The method set forth in claim 10 wherein said upper tooling assembly and lower tooling assembly is configured to form a plastic closure having a base wall, a peripheral skirt and an internal thread on the skirt.

12. The method set forth in claim 10 wherein said upper tool assembly includes a stripper sleeve.

13. The method set forth in claim 12 including providing a secondary actuator for actuating said stripper sleeve.

14. The method set forth in claim 11 wherein said upper tooling includes a movable sleeve interposed between the stripper sleeve and the core sleeve and a secondary actuator engaging said additional sleeve.

15. The method set forth in claim 10 wherein said mold plunger and said cavity mold are configured to form a closure having a base wall, an inner peripheral wall with an internal thread and an outer peripheral wall.

16. The method set forth in claim 15 wherein said upper tooling includes a movable sleeve interposed between the stripper sleeve and the core sleeve and a secondary actuator engaging said additional sleeve.

17. The method set forth in claim 10 wherein said mold plunger and cavity mold are configured to form a tamper indicating closure including a base wall, peripheral skirt and a tamper indicating band connected to the peripheral wall be integral bridges.

18. The method set forth in claim 17 wherein said upper tooling includes a movable sleeve interposed between the stripper sleeve and the core sleeve and a secondary actuator engaging said additional sleeve.

19. An apparatus for compression molding a plastic article comprising
- a first upper mold assembly having a male mold associated therewith,
- a second lower mold assembly having a cavity mold associated therewith, said cavity mold having a peripheral portion and an inner central portion having limited relative movement with respect to one another, said male mold and cavity mold having a configuration forming a closure which has a complex configuration,
- a first fixed cam associated with said first mold assembly and a second cam associated with said second mold assembly for moving said first mold assembly and said second mold assembly toward and away from one another,
- a fluid cylinder having a fluid filled chamber at a predetermined pressure and a piston associated with said second mold assembly, said central portion of said cavity mold being associated with said piston of said fluid cylinder such that there is limited permissible movement between said fluid cylinder and said associated tooling,
- means for connecting said fluid cylinder to a manifold to apply fluid to said cylinder continuously at said predetermined pressure during full motion at said tool assemblies, and
- means for moving said first and second mold assemblies relative to said cams to move the first and second mold assemblies toward one another to close the mold and compress a charge of extrudate in the cavity mold.

20. The apparatus set forth in claim 19 wherein said fluid cylinder is provided adjacent the cavity mold.

21. The apparatus set forth in claim 20 wherein said fluid cylinder comprises a gas cylinder.

22. The apparatus set forth in claim 19 wherein said fluid cylinder comprises a nitrogen cylinder.

23. The apparatus set forth in claim 19 wherein aid fluid cylinder comprises a hydraulic cylinder.

24. The apparatus set forth in any one of claims 19–23 wherein said apparatus includes an array of sets of first tool assemblies, associated second tool assemblies, and associated fluid cylinders,
- means for connecting all of said cylinders continuously to said manifold,
- means for moving said sets of tooling assemblies successively in an endless path past a station wherein a charge of extrudate is delivered successively to a cavity mold, and
- thereafter moving said sets of tooling successively past said cams to cause the charge to be formed into an article.

25. The apparatus set forth in claim 24 including means sensing the pressure in said fluid cylinders and producing a signal and means for controlling the pressure in response to variation of the pressure signal from a predetermined pressure.

26. The apparatus set forth in claim 25 including a rotary coupling between said source and said fluid cylinders.

27. The apparatus set forth in claim 26 wherein said means for sensing pressure is positioned to sense the pressure between a source and said rotary coupling.

28. The apparatus set forth in any one of claims 19–23 wherein said first tool assembly comprises a plunger and said second tool assembly comprises a cavity for forming a closure having a base wall and peripheral skirt.

29. The apparatus set forth in claim 28 wherein said mold plunger and said cavity mold have a configuration forming a closure having a base wall, a peripheral skirt and an internal thread on the peripheral skirt.

30. The apparatus set forth in claim 29 wherein said first tool assembly includes an additional sleeve interposed between the stripper sleeve and the core sleeve and an additional actuator connected to the additional sleeve for manipulating the additional sleeve.

31. The apparatus set forth in claim 30 wherein said mold plunger and cavity mold are configured to form a closure having a base wall, an inner peripheral wall with an internal thread and an outer peripheral wall.

32. The apparatus set forth in claim 30 wherein said mold plunger and cavity mold are configured to form a tamper indicating closure including a base wall, peripheral skirt and a tamper indicating band connected to the peripheral wall be integral bridges.

33. An apparatus for compression molding plastic articles comprising
- a base,
- a turret rotatably mounted on said base,
- means for rotating said turret,
- an upper annular array of segments removably mounted on said turret,
- a plurality of upper actuators removably mounted on each said upper segment,
- a lower annular array of segments removably mounted on said turret,
- a plurality of lower actuators removably mounted on each lower segment,
- an annular upper cam on said base for engaging and moving the upper actuators downwardly,
- a lower cam on said base for engaging and moving the lower actuators upwardly,
- said first mold assembly having a male mold associated therewith, said second mold assembly having a cavity mold associated therewith, said cavity mold having a peripheral portion and an inner central portion having limited relative movement with respect to one another, a first fixed cam associated with said first mold assembly and a second cam associated with said second mold assembly for moving said first mold assembly and said second mold assembly toward and away from one another, a fluid cylinder having a fluid filled chamber at predetermined pressure and a piston associated with said second mold assembly said piston engaging said central portion of said cavity mold, and means for connecting all of said fluid cylinders to a common manifold to apply fluid at said predetermined pressure during full motion at said turret and said tool assemblies.

34. The apparatus in claim 33 wherein said fluid cylinder is provided beneath the cavity mold.

35. The apparatus set forth in claim 34 wherein said fluid cylinder comprises a gas cylinder.

36. The apparatus in claim 34 wherein said fluid cylinder comprises a nitrogen cylinder.

37. The apparatus set forth in claim 36 including means sensing the pressure in said fluid cylinders and producing a signal and means for controlling the pressure in response to variation of the pressure from a predetermined pressure.

38. The apparatus set forth in claim 37 including a rotary coupling between said source and said fluid cylinders.

39. The apparatus set forth in claim 38 wherein said means for sensing pressure is positioned to sense the pressure between a source and said rotary coupling.

40. The apparatus set forth in any one of claims 33–36 and 37–39 wherein said first tool assembly comprises a plunger and said second tool assembly comprises a cavity for forming a closure having a base wall and peripheral skirt.

41. The apparatus set forth in claim 40 wherein said mold plunger and said cavity mold have a configuration forming a closure having a base wall, a peripheral skirt and an internal thread on the peripheral skirt.

42. The apparatus set forth in claim 41 wherein said first tool assembly includes an additional sleeve interposed between the stripper sleeve and the core sleeve and a secondary actuator connected to the additional sleeve for manipulating the additional sleeve.

43. The apparatus set forth in claim 42 wherein said mold plunger and cavity mold are configured to form a closure having a base wall, an inner peripheral wall with an internal thread and an outer peripheral wall.

44. The apparatus set forth in claim 43 wherein said mold plunger and cavity mold are configured to form a tamper indicating closure including a base wall, peripheral skirt and a tamper indicating band connected to the peripheral wall be integral bridges.

* * * * *